(12) United States Patent
Lee et al.

(10) Patent No.: US 9,713,096 B2
(45) Date of Patent: Jul. 18, 2017

(54) METHOD OF TERMINAL TRANSMITTING SOUNDING REFERENCE SIGNAL ON THE BASIS OF APERIODIC SOUNDING REFERENCE SIGNAL TRIGGERING AND METHOD FOR CONTROLLING UPLINK TRANSMISSION POWER TO TRANSMIT APERIODIC SOUNDING REFERENCE SIGNAL

(75) Inventors: Seungmin Lee, Anyang-si (KR); Hanbyul Seo, Anyang-si (KR); Kijun Kim, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 13/702,064

(22) PCT Filed: Jun. 3, 2011

(86) PCT No.: PCT/KR2011/004088
§ 371 (c)(1),
(2), (4) Date: Dec. 4, 2012

(87) PCT Pub. No.: WO2011/152685
PCT Pub. Date: Dec. 8, 2011

(65) Prior Publication Data
US 2013/0078913 A1  Mar. 28, 2013

Related U.S. Application Data

(60) Provisional application No. 61/351,306, filed on Jun. 4, 2010, provisional application No. 61/353,178, filed
(Continued)

(30) Foreign Application Priority Data

Jun. 3, 2011 (KR) .................. 10-2011-0053911

(51) Int. Cl.
*H04W 52/18* (2009.01)
*H04W 52/36* (2009.01)
(Continued)

(52) U.S. Cl.
CPC .......... *H04W 52/18* (2013.01); *H04L 5/0007* (2013.01); *H04L 5/0023* (2013.01);
(Continued)

(58) Field of Classification Search
CPC ... H04L 5/0007; H04L 5/0023; H04L 5/0048; H04L 5/0053; H04W 52/18;
(Continued)

(56) References Cited

U.S. PATENT DOCUMENTS

2008/0200203 A1   8/2008  Malladi et al.
2008/0280638 A1*  11/2008  Malladi et al. .............. 455/522
(Continued)

FOREIGN PATENT DOCUMENTS

CN    101436892    5/2009
CN    101606327    12/2009
(Continued)

OTHER PUBLICATIONS

NPL 3GPP Rel-8 TS 36211-890 for 13702064 Dec. 2009.*
(Continued)

*Primary Examiner* — Wesley Kim
*Assistant Examiner* — Dong-Chang Shiue
(74) *Attorney, Agent, or Firm* — Lee Hong Degerman Kang Waimey

(57) ABSTRACT

The method of the terminal transmitting the SRS on the basis of the aperiodic SRS triggering according to the present invention comprises the steps of: receiving a plurality of aperiodic SRS configuration information from the base station; receiving an aperiodic SRS transmission triggering indicator from the base station; selecting the specific aperi-
(Continued)

odic SRS configuration information among the plurality of aperiodic SRS configuration information on the basis of at least one among a sub-frame index for receiving the aperiodic SRS transmission triggering indicator, a time relation between the aperiodic SRS transmission sub-frames, and an uplink channel state; and transmitting an aperiodic SRS for the aperiodic SRS transmission triggering indicator on the basis of the selected aperiodic SRS configuration information, the plurality of aperiodic SRS configuration information including the information about a resource for transmitting the aperiodic SRS corresponding to the aperiodic SRS transmission triggering indicator. In addition, according to the present invention, the terminal can be used for receiving a power offset value for transmitting the aperiodic SRS from the base station and determining a transmission power value for transmitting the aperiodic SRS.

8 Claims, 20 Drawing Sheets

Related U.S. Application Data on Jun. 9, 2010, provisional application No. 61/369,654, filed on Jul. 30, 2010.

(51) Int. Cl.
  *H04L 5/00* (2006.01)
  *H04W 52/14* (2009.01)
  *H04W 52/32* (2009.01)

(52) U.S. Cl.
  CPC .......... *H04L 5/0048* (2013.01); *H04L 5/0053* (2013.01); *H04W 52/146* (2013.01); *H04W 52/325* (2013.01); *H04W 52/36* (2013.01)

(58) Field of Classification Search
  CPC ... H04W 52/34; H04W 52/36; H04W 52/146; H04W 52/325
  USPC ........................ 455/522, 67.11; 370/311, 318
  See application file for complete search history.

(56) References Cited

U.S. PATENT DOCUMENTS

| | | | | |
|---|---|---|---|---|
| 2010/0246561 | A1* | 9/2010 | Shin et al. ..................... | 370/345 |
| 2011/0199944 | A1* | 8/2011 | Chen et al. ................... | 370/329 |
| 2012/0252474 | A1* | 10/2012 | Tiirola et al. ................. | 455/450 |

FOREIGN PATENT DOCUMENTS

| | | |
|---|---|---|
| JP | 2011-142550 | 7/2011 |
| JP | 2013-062848 | 4/2013 |
| JP | 5350539 | 11/2013 |
| WO | 2010/018942 | 2/2010 |
| WO | 2010/048142 | 4/2010 |

OTHER PUBLICATIONS

NPL Aperiodic Sounding Reference Signals—61303244, Feb. 10, 2010.*
NPL 61303244 of PG Pub US 20110199944 (Chen) Aperiodic Sounding Reference Signals, filed Feb. 10, 2010.*
Mediatek Inc., "Further Discussion on Aperiodic Sounding", R1-101985, 3GPP TSG RAN WG1 Meeting #60bis, Apr. 2010, 2 pages.
ASUSTeK, "Discussion on Dynamic Aperiodic Sounding", R1-102357, 3GPP TSG RAN WG1 Meeting #60bis, Apr. 2010, 2 pages.
ZTE, "Consideration on dynamic aperiodic sounding", R1-101819, 3GPP TSG-RAN WG1#60bis, Apr. 2010, 3 pages.
Huawei, "Dynamic aperiodic UL sounding design", R1-101971, 3GPP TSG RAN WG1 Meeting #60bis, Apr. 2010, 4 pages.
PCT International Application No. PCT/KR2011/004088, Written Opinion of the International Searching Authority dated Jan. 18, 2012, 17 pages.
Motorola, "Views on SRS Enhancements for LTE-A," 3GPP TSG RAN WG1 Meeting #60bis, R1-102142, Apr. 2010, 4 pages.
The State Intellectual Property Office of the People's Republic of China Application Serial No. 201180027587.X, Office Action dated Dec. 2, 2014, 6 pages.
European Patent Office Application Serial No. 11790043.1, Search Report dated Jun. 18, 2015, 6 pages.
The State Intellectual Property Office of the People's Republic of China Application Serial No. 201180027587.X, Office Action dated Jul. 7, 2015, 6 pages.

* cited by examiner (A)

(B)

METHOD OF TERMINAL TRANSMITTING SOUNDING REFERENCE SIGNAL ON THE BASIS OF APERIODIC SOUNDING REFERENCE SIGNAL TRIGGERING AND METHOD FOR CONTROLLING UPLINK TRANSMISSION POWER TO TRANSMIT APERIODIC SOUNDING REFERENCE SIGNAL

CROSS-REFERENCE TO RELATED APPLICATIONS

This application is the National Stage filing under 35 U.S.C. 371 of International Application No. PCT/KR2011/004088, filed on Jun. 3, 2011, which claims the benefit of earlier filing date and right of priority to Korean Patent Application No. 10-2011-0053911, filed on Jun. 3, 2011, and also claims the benefit of U.S. Provisional Application Ser. No. 61/351,306, filed on Jun. 4, 2010, U.S. Provisional Application Ser. No. 61/353,178, filed on Jun. 9, 2010, and U.S. Provisional Application Ser. No. 61/369,654, filed on Jul. 30, 2010, the contents of which are all hereby incorporated by reference herein in their entirety.

TECHNICAL FIELD

The present invention relates to a wireless communication system, and more particularly, to a method for a User Equipment (UE) to transmit a Sounding Reference Signal (SRS) based on aperiodic SRS triggering and a method for a UE to control uplink transmission power for aperiodic SRS transmission.

BACKGROUND ART

Although wireless communication technologies have been developed up to LTE based on Wideband Code Division Multiple Access (WCDMA), demands and expectation of users and service providers are still on the rise. Since the development of other wireless access technologies is in progress, new technology evolution is needed to achieve future competitiveness. Such new technologies require a reduction in cost per bit, an increase in service availability, flexible use of frequency bands, simple structured and open interfaces, and appropriate power consumption of UEs.

Recently, standardization of the successor to LTE is in progress in 3GPP. In this specification, the successor will be referred to as "LTE-Advanced" or "LTE-A". Differences of the LTE-A system from the LTE system include system bandwidth and introduction of a repeater. The LTE-A system aims to support a wideband of up to 100 MHz. The LTE-A system uses carrier aggregation or bandwidth aggregation technology to achieve a wideband using a plurality of frequency blocks. In the carrier aggregation technology, a plurality of frequency blocks is used as one large logic frequency band in order to use a wider frequency band. The bandwidth of each frequency block may be defined based on the bandwidth of a system block used in the LTE system. Each frequency block is transmitted using a component carrier.

In order to guarantee accurate uplink channel estimation, the 3GPP-LTE-A system supports aperiodic SRS transmission in addition to conventional periodic SRS transmission. Aperiodic SRS configuration information and uplink transmission power control for aperiodic SRS transmission are needed to support such aperiodic SRS transmission. However, detailed aperiodic SRS configuration information and methods for controlling uplink transmission power for aperiodic SRS transmission have not yet been suggested.

DISCLOSURE

Technical Problem

An object of the present invention is to provide a method for a User Equipment (UE) to transmit a Sounding Reference Signal (SRS) based on aperiodic SRS triggering.

Another object of the present invention is to provide a method for a UE to control uplink transmission power for aperiodic SRS transmission.

Another object of the present invention is to provide a UE for transmitting an aperiodic SRS based on aperiodic SRS triggering.

Another object of the present invention is to provide a UE for controlling uplink transmission power for aperiodic SRS transmission.

Objects of the present invention are not limited to those described above and other objects will be clearly understood by those skilled in the art from the following description.

Technical Solution

A method for transmitting a Sounding Reference Signal (SRS) triggering based aperiodic SRS triggering at a user equipment (UE) in a wireless communication system according to the present invention for achieving the objects may include receiving a plurality of aperiodic SRS configuration information from an eNodeB, receiving an aperiodic SRS transmission triggering indicator from the eNodeB, selecting specific aperiodic SRS configuration information from among a plurality of aperiodic SRS configuration information based on at least one of an index of a subframe in which the aperiodic SRS transmission triggering indicator is received, a time relationship between a subframe in which the aperiodic SRS transmission triggering indicator is received and a corresponding aperiodic SRS transmission subframe, an uplink channel state, and transmitting an aperiodic SRS associated with the aperiodic SRS transmission triggering indicator based on the selected aperiodic SRS configuration information, wherein the plurality of aperiodic SRS configuration information includes information regarding a resource for transmitting an aperiodic SRS in response to the aperiodic SRS transmission triggering indicator. Here, the aperiodic SRS may be transmitted through a first aperiodic SRS transmission subframe which is an earliest subframe among the preconfigured periodic SRS transmission subframes subsequent to subframe n when the aperiodic SRS transmission triggering indicator is received in the subframe n or may be transmitted through a second aperiodic SRS transmission subframe which is an earliest subframe among the preconfigured periodic SRS transmission subframes subsequent to subframe n+3 when the aperiodic SRS transmission triggering indicator is received in the subframe n.

When the index n of the subframe in which the aperiodic SRS transmission triggering indicator is received is even, the aperiodic SRS transmission may include transmitting the aperiodic SRS through a partial band in a frequency axis of the first aperiodic SRS subframe or the second aperiodic SRS subframe. Here, when transmission power for transmitting the aperiodic SRS corresponding to the aperiodic SRS transmission triggering indicator is not sufficient, the aperiodic SRS may be transmitted through a fallback aperiodic SRS resource predefined in the partial band.

On the other hand, when the index n of the subframe in which the aperiodic SRS transmission triggering indicator is received is odd, the aperiodic SRS transmission may include transmitting the aperiodic SRS through a full band in a frequency axis of the first aperiodic SRS subframe or the second aperiodic SRS subframe. Here, when transmission power for transmitting the aperiodic SRS corresponding to the aperiodic SRS transmission triggering indicator is not sufficient, the aperiodic SRS may be transmitted through a fallback aperiodic SRS resource predefined in the full band.

In addition, when a time difference between the subframe n in which the aperiodic SRS transmission triggering indicator is received and at least one periodic SRS transmission subframe allocated to the UE corresponds to 4 subframes, a first periodic SRS configuration may be selected from the plurality of aperiodic SRS configurations and the aperiodic SRS may be transmitted through the first aperiodic SRS subframe according to the first aperiodic SRS configuration. Here, the aperiodic SRS may be transmitted through a full band in a frequency axis of the first aperiodic SRS subframe.

On the other hand, when a time difference between the subframe n in which the aperiodic SRS transmission triggering indicator is received and at least one periodic SRS transmission subframe allocated to the UE does not correspond to 4 subframes, a second periodic SRS configuration is selected from the plurality of aperiodic SRS configurations and the aperiodic SRS is transmitted through the second aperiodic SRS subframe according to the second aperiodic SRS configuration. Here, the aperiodic SRS may be transmitted through a partial band in a frequency axis of the second aperiodic SRS subframe.

When the uplink channel state is worse than a predefined channel state, a second aperiodic SRS configuration may be selected from the plurality of aperiodic SRS configurations and the aperiodic SRS may be transmitted through a partial band in a frequency axis of the second aperiodic SRS subframe or the first aperiodic SRS subframe according to the second aperiodic SRS configuration.

On the other hand, when the uplink channel state is better than a predefined channel state, a second aperiodic SRS configuration may be selected from the plurality of aperiodic SRS configurations and the aperiodic SRS may be transmitted through a full band in a frequency axis of the second aperiodic SRS subframe or the first aperiodic SRS subframe according to the first aperiodic SRS configuration.

A method for controlling an uplink transmission power for aperiodic Sounding Reference Signal (SRS) transmission at a user equipment (UE) in a wireless communication system according to an embodiment of the present invention for achieving the objects may include receiving a power offset value for the aperiodic SRS transmission from an eNodeB, determining an aperiodic SRS transmission power value using the power offset value for the aperiodic SRS transmission, and transmitting an aperiodic SRS using the determined aperiodic SRS transmission power value. The power offset value only for the aperiodic SRS transmission may be a UE-specific value received through higher layer signaling. In addition, the method may further include receiving the aperiodic SRS transmission triggering indicator from the eNodeB, wherein the aperiodic SRS transmission may be performed according to the aperiodic SRS transmission triggering indicator.

A method for controlling an uplink transmission power for aperiodic Sounding Reference Signal (SRS) transmission at a User Equipment (UE) in a wireless communication system according to another embodiment of the present invention for achieving the objects may include receiving a power offset value for periodic SRS transmission and a power offset value for aperiodic SRS transmission from an eNodeB, receiving an indicator for triggering aperiodic SRS transmission from the eNodeB, and determining a transmission power value for the aperiodic SRS transmission using the power offset value for the aperiodic SRS transmission according to the aperiodic SRS transmission triggering indicator.

A user equipment for transmitting a Sounding Reference Signal (SRS) based on aperiodic SRS triggering for achieving the objects may include a receiver configured to receive a plurality of aperiodic SRS configuration information and an aperiodic SRS transmission triggering indicator from an eNodeB, a processor configured to select specific aperiodic SRS configuration information from among a plurality of aperiodic SRS configuration information based on at least one of an index of a subframe in which the aperiodic SRS transmission triggering indicator is received, a time relationship between a subframe in which the aperiodic SRS transmission triggering indicator is received and a corresponding aperiodic SRS transmission subframe, an uplink channel state, and a transmitter configured to transmit an aperiodic SRS associated with the aperiodic SRS transmission triggering indicator based on the selected aperiodic SRS configuration information, wherein the plurality of aperiodic SRS configuration information may include information regarding resources for transmitting an aperiodic SRS in response to the aperiodic SRS transmission triggering indicator.

A user equipment for controlling uplink transmission power for aperiodic Sounding Reference Signal (SRS) transmission in a wireless communication system according to the present invention for the objects may include a receiver configured to receive a power offset value for the aperiodic SRS transmission from an eNodeB, a processor configured to determine an aperiodic SRS transmission power value using the power offset value for the aperiodic SRS transmission, and a transmitter configured to transmit an aperiodic SRS using the determined aperiodic SRS transmission power value.

Advantageous Effects

The UE transmits aperiodic SRSs according to an aperiodic SRS configuration according to the present invention, thereby enabling more correct uplink channel state estimation. In addition, the UE selects specific aperiodic SRS configuration information from among a plurality of aperiodic SRS configuration information based on at least one of an index of a subframe in which the aperiodic SRS transmission triggering indicator is received, a time relationship between a subframe in which the aperiodic SRS transmission triggering indicator is received and a corresponding aperiodic SRS transmission subframe, an uplink channel state, thereby improving communication performance.

In addition, the method not only contributes to more correctly estimating the uplink channel state but can also efficiently overcome an SRS coverage problem and an uplink signal interference problem in a co-channel HetNet of the same channel through adaptive aperiodic SRS configuration switching.

Further, it is possible to determine an aperiodic SRS transmission power using an uplink power control equation for aperiodic SRS transmission suggested in the present invention and to transmit an aperiodic SRS using the determined power.

Advantages of the present invention are not limited to those described above and other advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings:

FIG. 7(a) illustrates a reference signal pattern when a normal Cyclic Prefix (CP) is applied and FIG. 7(b) illustrates a reference signal pattern when an extended CP is applied.

BEST MODE

Hereinafter, the preferred embodiments of the present invention will be described with reference to the accompanying drawings. It is to be understood that the detailed description which will be disclosed with reference to the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For example, the following description will be made on the assumption that a mobile communication system is a $3^{rd}$ Generation Partnership Project (3GPP) Long Term Evolution (LTE) system, but the present invention is applicable to other mobile communication systems excluding the unique matters of the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts. The exemplary embodiment of the specification is not in any way preferable to other embodiments.

In the following description, it is assumed that a terminal includes a mobile or fixed user end device such as a user equipment (UE), a mobile station (MS) and an Advanced Mobile Station (AMS), and a base station includes a node of a network end communicating with a terminal, such as a Node-B, an eNode B, a base station, and an Access Point (AP).

In a mobile communication system, a UE or a relay node may receive information from a base station through downlink/backhaul downlink and transmit information uplink/backhaul uplink. The information transmitted or received by the UE or the relay node includes data and a variety of control information, and a variety of physical channels is present according to the type and usage of information transmitted or received by the UE or the relay node.

Although a wireless communication system including one eNB, one UE, and one relay node is shown for simplicity, the wireless communication system 100 may include one or more eNBs, one or more relay nodes and/or one or more UEs. That is, the base station includes various eNBs such as a macro eNB and a femto eNB and the UE includes various UEs such as a macro UE and a femto UE.

Figure 1:
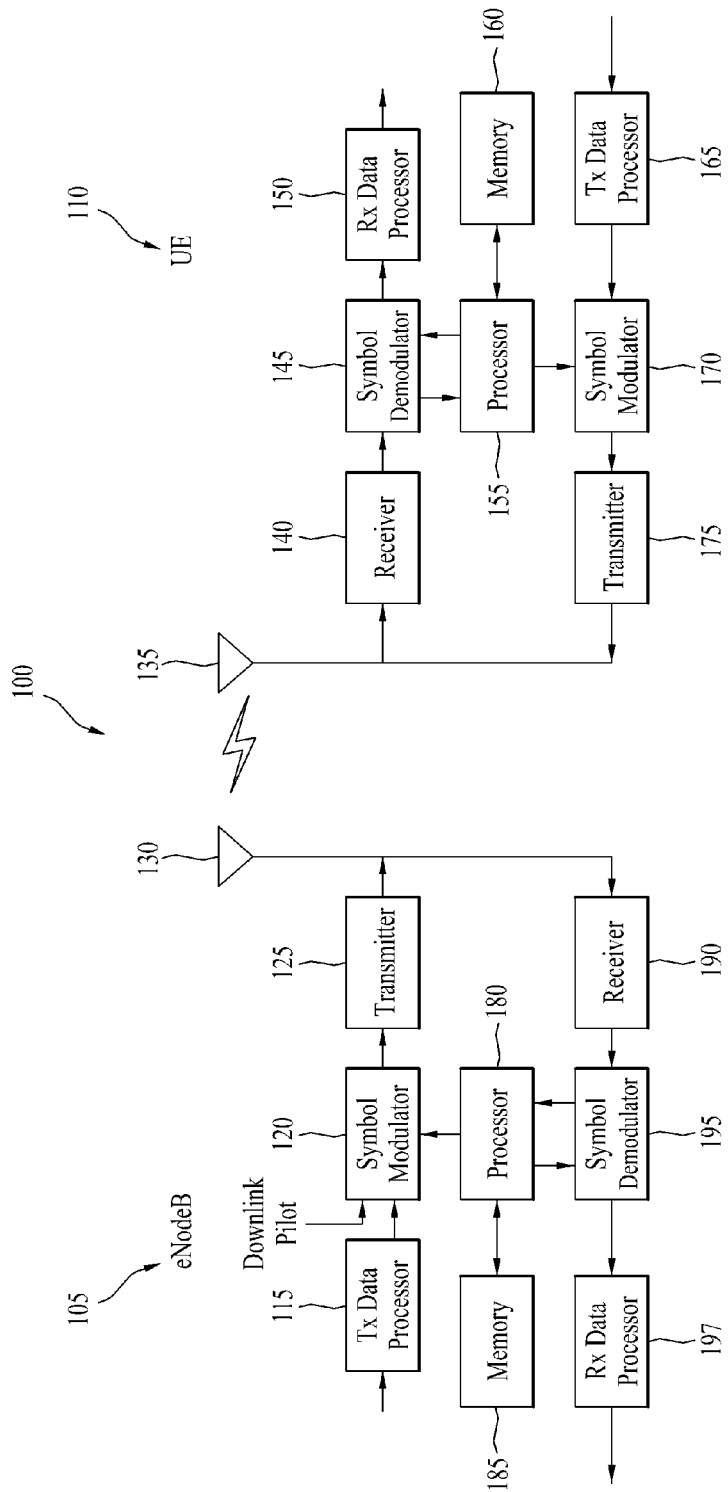
FIG. 1 is a block diagram illustrating a configuration of an eNodeB and a UE in a wireless communication system according to the present invention.

FIG. 1 is a block diagram showing the configuration of a communication system according to the present invention.

The communication system according to the present invention may include an eNB 105, a UE 110 and relay node (not shown). Although the communication system 100 including one eNB 105, and one UE 110 is shown for simplicity, the communication system 100 according to the present invention may include a plurality of eNBs and a plurality of UEs.

Referring to FIG. 1, the eNB 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 145 and an Rx data processor 165.

Although one antenna 130 or 135 is included in the eNB 105 or the UE 110, a plurality of antennas may be included in the eNB 105 or the UE 110. Accordingly, the eNB 105 and the UE 110 according to the present invention supports Multiple Input Multiple Output (MIMO). The eNB 105 and the UE 110 according to the present invention may support both Single User (SU)-MIMO and Multi User (MU)-MIMO.

In downlink, the Tx data processor 115 of the eNB 105 receives traffic data, formats and codes the received traffic data, interleaves and modulates (or symbol-maps) the coded traffic data, and provides modulated symbols (data symbols). The symbol modulator 120 receives and processes the data symbols and pilot symbols and provides a symbol stream. The symbol modulator 120 of the eNB 105 multiplexes data and pilot symbols and transmits the multiplexed data to the transmitter 125. At this time, each transmitted symbol may be a data symbol, a pilot symbol or a zero (null) signal value. In each symbol period, pilot symbols may be consecutively transmitted. The pilot symbols may be Frequency Division Multiplexed (FDM), Orthogonal Frequency Division Multiplexed (OFDM), Time Division Multiplexed (TDM) or Code Division Multiplexed (CDM) symbols. The transmitter 125 of the eNB 105 receives the symbol stream, converts the symbol stream into one or more analog signals, additionally adjusts (for example, amplifies, filters, frequency up-converts) the analog signals, and generates a downlink signal suitable for transmission through a radio channel. Subsequently, the downlink signal is transmitted to the the UE 110 through the antenna 130.

In the UE 110, the antenna 135 receives the downlink signal from the eNB 105 and provides the received signal to the receiver 140. The receiver 140 adjusts (for example, filters, amplifies, and frequency down-converts) the received signal, digitizes the adjusted signal, and acquires samples. The symbol demodulator 145 demodulates the received pilot symbols and provides the pilot signals to the processor 155, for channel estimation.

The symbol demodulator 145 receives a frequency response estimation value for downlink from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps), deinterleaves and decodes the data symbol estimation values and restore the transmitted traffic data.

The processes by the symbol demodulator 145 and the Rx data processor 150 are complementary to the processes by the symbol modulator 170 and the Tx data processor 165 of the eNB 105.

In the UE 110, the Tx data processor 165 processes traffic data and provides data symbols in uplink. The symbol modulator 170 receives the data symbols, multiplexes the data symbols with pilot symbols, performs modulation, and provides a symbol stream to the transmitter 186. The transmitter 175 receives and processes the symbol stream, generates an uplink signal, and transmits the uplink signal to the eNB 105 through the antenna 135.

In the eNB 105, the uplink signal is received from the UE 110 through the antenna 130. The receiver 190 processes the received uplink signal and acquires samples. Subsequently, the symbol demodulator 195 processes the samples and provides pilot symbols and data symbol estimation values received in uplink. The Rx data processor 197 processes the data symbol estimation values and restores the traffic data transmitted from the UE 110.

The respective processors 180 and 155 of the eNB 105 and the UE 110 instruct (for example, control, adjust, or manage) the operations of the eNB 105 and the UE 110, respectively. The processors 180 and 155 may be connected to the memories 185 and 160 for storing program codes and data, respectively. The memories 185 and 160 are respectively connected to the processors 180 and 155 so as to store operating systems, applications and general files.

The processors 180 and 155 may be called controllers, microcontrollers, microprocessors, microcomputers, etc. The processors 180 and 155 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 180 and 155.

If the embodiments of the present invention are implemented by firmware or software, the firmware or software may be configured to include modules, procedures, functions, etc. for performing the functions or operations of the present invention. The firmware or software configured to perform the present invention may be included in the processors 180 and 155 or may be stored in the memories 185 and 160 so as to be driven by the processors 180 and 155.

Layers of the radio interface protocol between the eNB 105 and the UE 110 in the wireless communication system (network) may be classified into a first layer (L1), a second layer (L2) and a third layer (L3) based on the three low-level layers of the known Open System Interconnection (OSI) model of a communication system. A physical layer belongs to the first layer and provides an information transport service through a physical channel. A Radio Resource Control (RRC) layer belongs to the third layer and provides control radio resources between the UE 110 and the network. The eNB 105 and the UE 110 exchange RRC messages with each other through a wireless communication network and the RRC layer.

Figure 2:
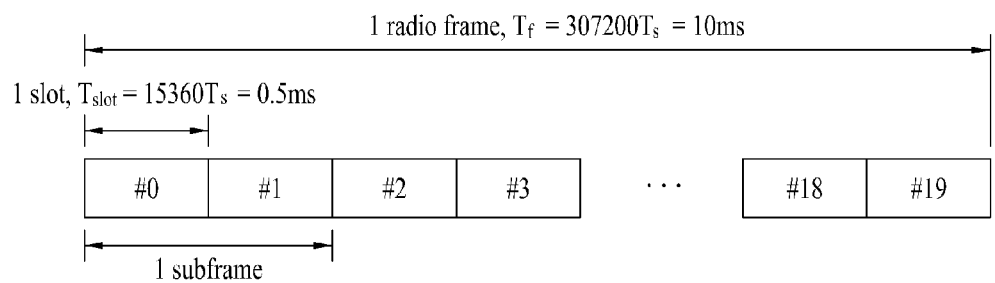
FIG. 2 illustrates a structure of a radio frame used in a 3GPP LTE system which is an exemplary mobile communication system.

FIG. 2 illustrates the structure of a radio frame in a 3rd Generation Partnership Project (3GPP) Long Term Evolution (LTE) system as an example of a mobile communication system.

Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 3:
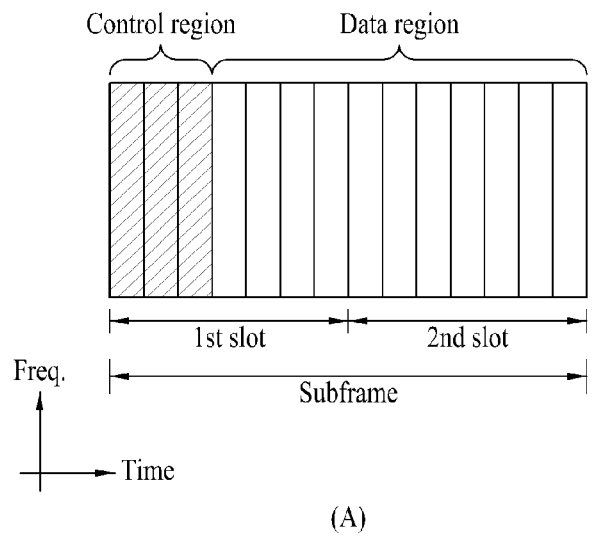
FIGS. 3A and 3B illustrate structures of downlink and uplink subframes in a 3GPP LTE system which is an exemplary mobile communication system.
Figure 3:
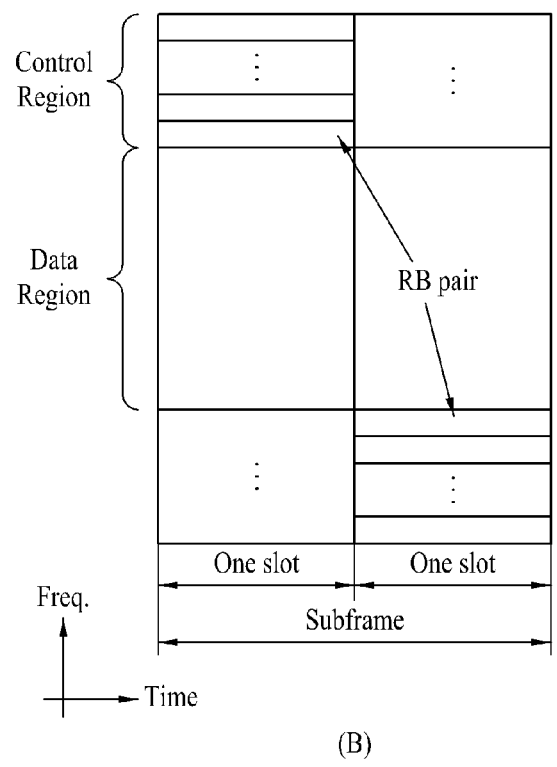

FIG. 3 illustrates the structures of downlink and uplink subframes in the 3GPP LTE system.

Referring to the FIG. 3(a), a maximum of three OFDM symbols located in a front portion of a 1st slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

Now, a PDCCH that is a downlink physical channel will be described.

The PDCCH can carry a PDSCH's resource assignment and transport format (referred to as a downlink grant), PUSCH's resource assignment information (referred to as an uplink grant), a transmit power control command for individual UEs within any UE group, activation of a voice over Internet (VoIP), etc. A plurality of PDCCHs can be transmitted in a control region, and the UE can monitor the plurality of PDCCHs. The PDCCH consists of an aggregation of one or several consecutive control channel elements (CCEs). The PDCCH consisting of the aggregation of one or several consecutive CCEs can be transmitted on a control region after being processed with subblock interleaving. The CCE is a logical assignment unit used to provide the PDCCH with a coding rate depending on a wireless channel condition. The CCE corresponds to a plurality of resource element groups. According to an association relation between the number of CCEs and a coding rate provided by the CCEs, a format of the PDCCH and the number of bits of an available PDCCH are determined.

Control information transmitted over the PDCCH is referred to as downlink control information (DCI). The following table shows the DCI according to a DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |

TABLE 1-continued

| DCI Format | Description |
| --- | --- |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

A DCI format 0 indicates uplink resource assignment information. DCI formats 1 to 2 indicate downlink resource assignment information. DCI formats 3 and 3A indicate an uplink transmit power control (TPC) command for any UE groups.

A method for allowing a BS to perform resource mapping for PDCCH transmission in the 3GPP LTE system will hereinafter be described in detail.

Generally, the BS may transmit scheduling allocation information and other control information over the PDCCH. Information about a physical control channel (PCCH) is configured in the form of one aggregate (one aggregation) or several CCEs, such that the resultant information is transmitted as one aggregate or several CCEs. Namely, a PDCCH transmission unit of the BS is a CCE. One CCE includes 9 resource element groups (REGs). The number of RBGs unallocated to either Physical Control Format Indicator Channel (PCFICH) or Physical Hybrid Automatic Repeat Request Indicator Channel (PHICH) is $N_{REG}$. CCEs from 0 to $N_{CCE}-1$ may be available to a system (where, $N_{CCE}=\lfloor N_{REG}/9 \rfloor$). PDCCH supports multiple formats as shown in the following Table 3. One PDCCH composed of n contiguous CCEs begins with a CCE having 'i mod n=0' (where 'i' is a CCE number). Multiple PDCCHs may be transmitted through one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, a base station (BS) may decide a PDCCH format according to how many regions are required for the BS to transmit control information. The UE reads control information and the like in units of a CCE, resulting in reduction of overhead. Likewise, the relay node (RN) may also read control information and the like in units of a Relay-CCE (R-CCE). In the LTE-A system, in order to allow the BS to transmit R-PDCCH information for an arbitrary RN, a resource element (RE) may be mapped in units of a Relay-Control Channel Element (R-CCE).

Referring to the FIG. 3(b), an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 4:
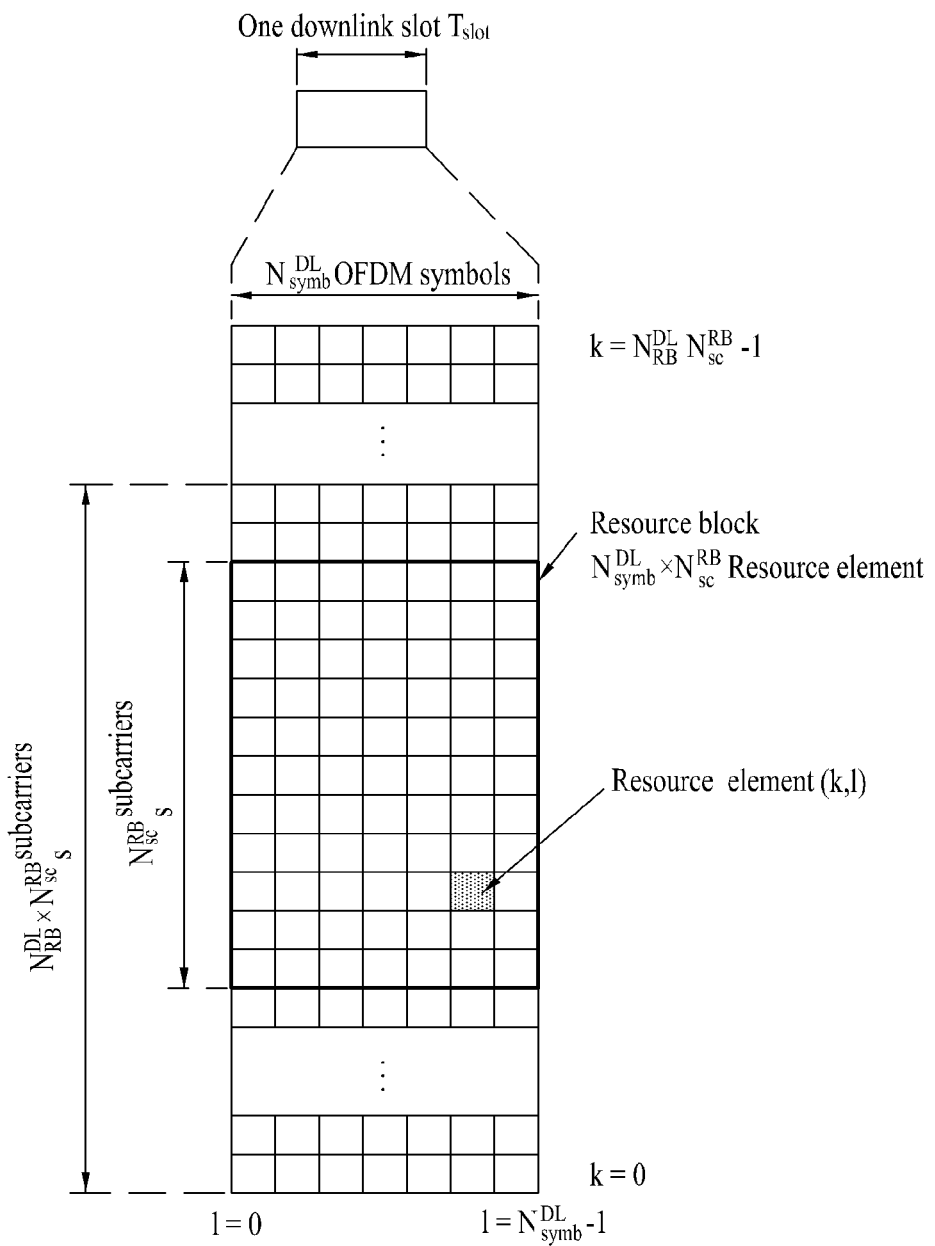
FIG. 4 illustrates a downlink time-frequency resource grid structure used in the present invention.

FIG. 4 illustrates a downlink time-frequency resource grid structure according to the present invention.

Referring to the FIG. 4, the transmitted signal in each slot is described by a resource grid of $N_{RB}^{DL} \times N_{SC}^{RB}$ subcarriers and $N_{symb}^{DL}$ OFDM symbols. Here, $N_{RB}^{DL}$ represents for the number of resource blocks (RBs) for downlink, $N_{SC}^{RB}$ represents for the number of subcarriers constituting a RB, and $N_{symb}^{DL}$ represents for the number of OFDM symbols in a downlink slot. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$ where $N_{RB}^{min,DL}$ and $N_{RB}^{max,RB}$, though not limited to these values, are the smallest and largest downlink bandwidth, respectively. Here, $N_{RB}^{min,DL}$ is the minimum downlink bandwidth and $N_{RB}^{max,RB}$ the maximum downlink bandwidth supported by the wireless communication system. The number of OFDM symbols in a slot depends on the cyclic prefix (CP) length and subcarrier spacing. In case of multi-antenna transmission, there may be one resource grid defined per antenna port.

Each element in the resource grid for antenna port p is called a resource element and is uniquely identified by the index pair (k,l) in a slot where k=0, . . . , $N_{RB}^{DL}N_{SC}^{RB}-1$ and l=0, . . . , $N_{symb}^{DL}-1$ are the indices in the frequency and time domains, respectively.

Resource blocks shown in FIG. 4 are used to describe the mapping of certain physical channels to resource elements. RB is classified into physical resource block (PRB) and virtual resource block (VRB).

A physical resource block is defined as $N_{symb}^{DL}$ consecutive OFDM symbols in the time domain and $N_{SC}^{RB}$ consecutive subcarriers in the frequency domain, where $N_{symb}^{DL}$ and $N_{SC}^{RB}$ may be given by Table 3. A physical resource block thus consists of $N_{symb}^{DL} \times N_{SC}^{RB}$ resource elements, corresponding to one slot in the time domain and 180 kHz in the frequency domain, though not limited to these values.

TABLE 3

| Configuration | | $N_{sc}^{RB}$ | $N_{symb}^{DL}$ |
| --- | --- | --- | --- |
| Normal cyclic prefix | Δf = 15 kHz | 12 | 7 |
| Extended cyclic prefix | Δf = 15 kHz | | 6 |
| | Δf = 7.5 kHz | 24 | 3 |

Physical resource blocks are numbered from 0 to $N_{RB}^{DL}-1$ in the frequency domain. The relation between the physical resource block number in the frequency domain and resource elements (k,l) in a slot is given by $$n_{PRB} = \left\lfloor \frac{k}{N_{sc}^{RB}} \right\rfloor.$$

A VRB can have the same size as that of the PRB. There are two types of VRBs defined, the first one being a localized type and the second one being a distributed type. For each VRB type, a pair of VRBs have a single VRB index in common (may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

Hereinafter, the general MIMO technology will be described. The MIMO technology is an abbreviation of the Multi-Input Multi-Output technology. The MIMO technology uses multiple transmission (Tx) antennas and multiple reception (Rx) antennas to improve the efficiency of Tx/Rx data, whereas a previously conventional technique has generally used a single transmission (Tx) antenna and a single reception (Rx) antenna. In other words, the MIMO technology allows a transmission end or reception end of a wireless communication system to use multiple antennas (hereinafter referred to as a multi-antenna), so that the capacity or performance can be improved. For the convenience of description, the term "MIMO" can also be considered to be a multi-antenna technology.

In more detail, the MIMO technology is not dependent on a single antenna path to receive a single total message, collects a plurality of data pieces received via several antennas, and completes total data. As a result, the MIMO technology can increase a data transfer rate within a specific range, or can increase a system range at a specific data transfer rate.

The next-generation mobile communication technology requires a higher data transfer rate than that of a conventional mobile communication technology, so that it is expected that the effective MIMO technology is requisite for the next-generation mobile communication technology. Under this assumption, the MIMO communication technology is the next-generation mobile communication technology to be applied to mobile communication terminals or repeaters, and can extend the range of a data communication range, so that it can overcome the limited amount of transfer data of other mobile communication systems due to a variety of limited situations.

In the meantime, the MIMO technology from among a variety of technologies capable of improving the transfer efficiency of data can greatly increase an amount of communication capacity and Tx/Rx performances without allocating additional frequencies or increasing an additional power. Due to these technical advantages, most companies or developers are intensively paying attention to this MIMO technology.

Figure 5:
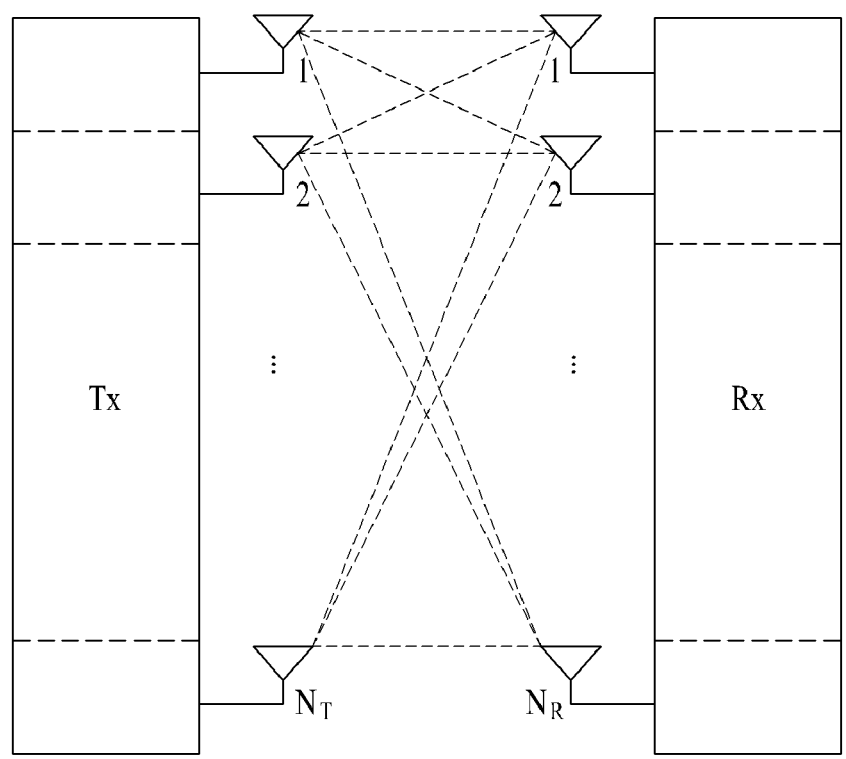
FIG. 5 illustrates a configuration of a general MIMO communication system.

FIG. 5 illustrates an exemplary of general multiple antennas communication.

Referring to FIG. 5, if the number of transmission (Tx) antennas increases to $N_T$, and at the same time the number of reception (Rx) antennas increases to $N_R$, a theoretical channel transmission capacity of the MIMO communication system increases in proportion to the number of antennas, differently from the above-mentioned case in which only a transmitter or receiver uses several antennas, so that a transfer rate and a frequency efficiency can greatly increase.

In this case, the transfer rate acquired by the increasing channel transmission capacity is equal to the multiplication of a maximum transfer rate ($R_o$) acquired when a single antenna is used and a rate increment ($R_i$), and can theoretically increase. The rate increment ($R_i$) can be represented by the following equation 1:

$$R_i = \min(N_T, N_R) \quad \text{[Equation 1]}$$

A mathematical modeling of a communication method for use in the above-mentioned MIMO system will hereinafter be described in detail. Firstly, as can be seen from FIG. 2-6, it is assumed that $N_T$ Tx antennas and $N_R$ Rx antennas exist. In the case of a transmission (Tx) signal, a maximum number of transmission information pieces is $N_T$ under the condition that $N_T$ Tx antennas are used, so that the Tx signal can be represented by a specific vector shown in the following equation 2:

$$s=[s_1, s_2, \ldots, s_{N_T}]^T \qquad \text{[Equation 2]}$$

In the meantime, individual transmission information pieces ($s_1, s_2, \ldots, s_{N_T}$) may have different transmission powers. In this case, if the individual transmission powers are denoted by ($P_1, P_2, \ldots, P_{N_T}$), transmission information having an adjusted transmission power can be represented by a specific vector shown in the following equation 3:

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In Equation 3, $\hat{s}$ is a diagonal matrix of a transmission power, and can be represented by the following equation 4:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

In the meantime, the information vector $\hat{s}$ having an adjusted transmission power is multiplied by a weight matrix (W), so that $N_T$ transmission (Tx) signals ($x_1, x_2, \ldots, x_{N_T}$) to be actually transmitted are configured. In this case, the weight matrix is adapted to properly distribute Tx information to individual antennas according to Tx-channel situations. The above-mentioned Tx signals ($x_1, x_2, \ldots, x_{N_T}$) can be represented by the following equation 5 using the vector (x):

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, $w_{ij}$ is a weight between the i-th Tx antenna and the j-th Tx information, and W is a matrix indicating the weight $w_{ij}$. The matrix W is called a weight matrix or a precoding matrix. In the meantime, the above-mentioned Tx signal (x) can be considered in different ways according to two cases, i.e., a first case in which the spatial diversity is used and a second case in which the spatial multiplexing is used. In the case of using the spatial multiplexing, different signals are multiplexed and the multiplexed signals are transmitted to a destination, so that elements of the information vector (s) have different values.

Otherwise, in the case of using the spatial diversity, the same signal is repeatedly transmitted via several channel paths, so that elements of the information vector (s) have the same value. Needless to say, the combination of the spatial multiplexing scheme and the spatial diversity scheme may also be considered. In other words, the same signal is transmitted via three Tx antennas according to the spatial diversity scheme, and the remaining signals are spatially multiplexed and then transmitted to a destination. Next, if $N_R$ Rx antennas are used, Rx signals ($y_1, y_2, \ldots, y_{N_R}$) of individual antennas can be represented by a specific vector (y) shown in the following equation 6:

$$y=[y_1, y_2, \ldots, y_{N_R}]^T \qquad \text{[Equation 6]}$$

In the meantime, if a channel modeling is executed in the MIMO communication system, individual channels can be distinguished from each other according to Tx/Rx antenna indexes. A specific channel passing the range from a Tx antenna (j) to an Rx antenna (i) is denoted by $h_{ij}$. In this case, it should be noted that the index order of the channel $h_{ij}$ is located before an Rx-antenna index and is located after a Tx-antenna index. Several channels are tied up, so that they are displayed in the form of a vector or matrix. An exemplary vector is as follows.

Figure 6:
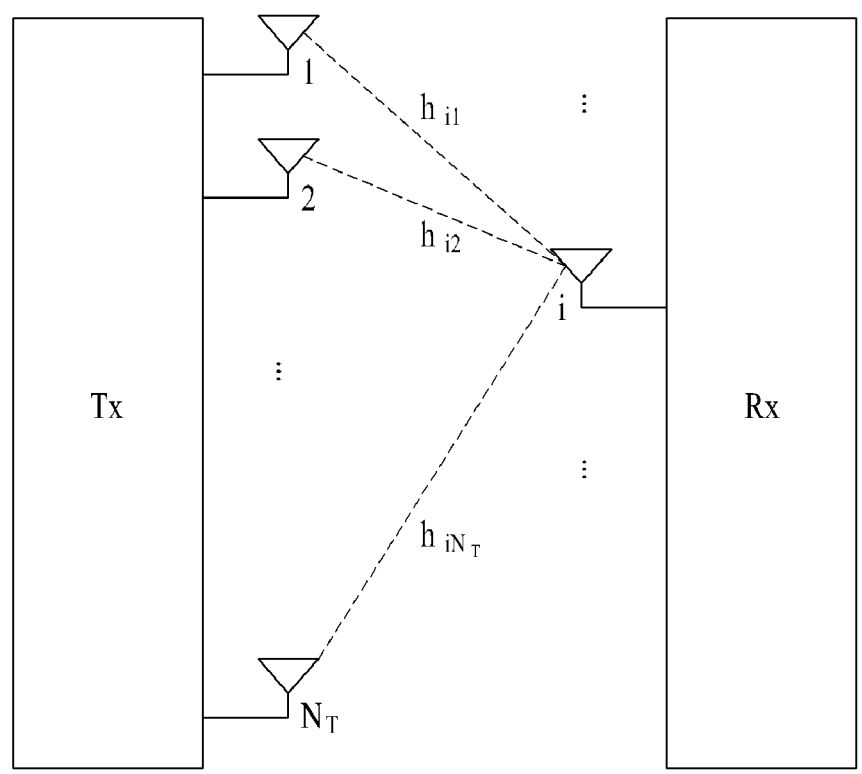
FIG. 6 illustrates channels from $N_T$ transmit antennas to receive antenna i.

FIG. 6 shows channels from $N_T$ Tx antennas to an Rx antenna (i). Referring to FIG. 6, the channels passing in the range from the $N_T$ Tx antennas to the Rx antenna (i) can be represented by the following equation 7:

$$h_i^T = [h_{i1}, h_{i2}, \ldots, h_{iN_T}] \qquad \text{[Equation 7]}$$

If all channels passing in the range from the $N_T$ Tx antennas to $N_R$ Rx antennas are denoted by the matrix shown in Equation 7, the following equation 8 is acquired:

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1}^T & h_{N_R 2}^T & \ldots & h_{N_R N_T} \end{bmatrix} \qquad \text{[Equation 8]}$$

In the meantime, an Additive White Gaussian Noise (AWGN) is added to an actual channel which has passed the channel matrix H shown in Equation 8. The AWGN ($n_1, n_2, \ldots, n_{N_R}$) added to each of $N_R$ Rx antennas can be represented by a specific vector shown in the following equation 9:

$$n=[n_1, n_2, \ldots, n_{N_R}]^T \qquad \text{[Equation 9]}$$

By the above-mentioned modeling method of the Tx signal, Rx signal, and AWGN, each MIMO communication system can be represented by the following equation 10:

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_T} \end{bmatrix} = \qquad \text{[Equation 10]}$$

$$Hx + n$$

In the meantime, the number of rows and the number of columns of a channel matrix H indicating a channel condition is determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by $N_R \times N_T$ matrix.

Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11:

$$\text{rank}(H) \leq \min(N_T, N_R) \quad \text{[Equation 11]}$$

A downlink reference signal will hereinafter be described in detail.

The downlink reference signal includes a common reference signal (CRS) shared among all UEs contained in a cell and a dedicated reference signal (DRS) assigned to a specific UE. In the 3GPP LTE-A system or the like, the DRS may also be referred to as a demodulation RS (DM RS).

The common reference signal (CRS) may be used to acquire channel status information and perform handover measurement. The dedicated reference signal (DRS) may be used to demodulate data. The CRS may be a cell-specific reference signal, and the DRS may be a UE-specific reference signal.

The UE measures the CRS and informs the BS of channel feedback information (e.g., Channel Quality Information (CQI), Precoding Matrix Indicator (PMI), and Rank Indicator (RI)). The BS performs downlink frequency scheduling using feedback information received from the UE.

In order to transmit the aforementioned reference signals to the UE, the BS performs resource allocation in consideration of the amount of radio resources to be allocated to each reference signal, exclusive position of the CRS and the DRS, position of a synchronous channel (SCH) and a broadcast channel (BCH), the DRS density, and the like.

In this case, provided that a relatively large amount of resources is assigned to each reference signal, a data transmission rate is relatively deteriorated whereas channel estimation performance is increased. Provided that a relatively small amount of resources is assigned to each reference signal, a reference signal density is lowered whereas a data transmission rate is increased, resulting in deterioration of channel estimation performance. Effective resource allocation of each reference signal in consideration of channel estimation, data transmission rate, etc. is of importance to system performance.

Figure 7:
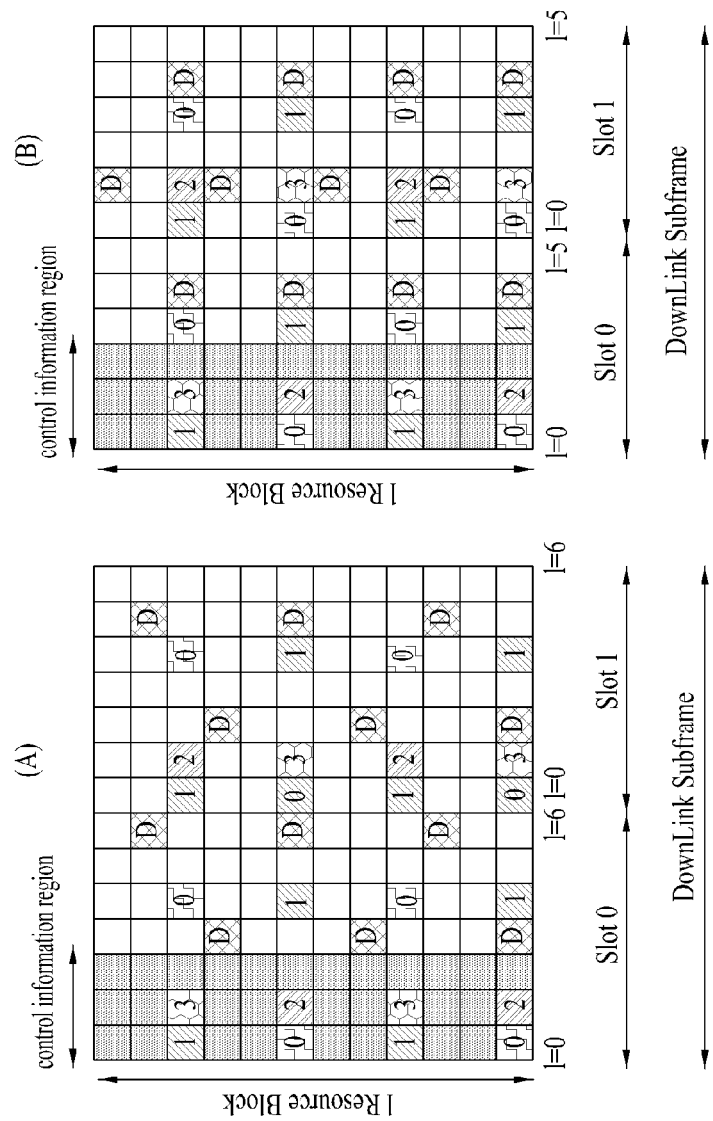
FIGS. 7(a) and 7(b) illustrate a reference signal pattern in a 3GPP LTE system which is an exemplary mobile communication system, where

FIG. 7 is a conceptual diagram illustrating a reference signal (RS) structure for use in a downlink (DL) subframe according to one embodiment of the present invention, and shows a subframe structure mapped to a reference signal in a system capable of supporting a maximum of 4 antennas.

Referring to FIG. 7, one downlink subframe is composed of two time slots in a time domain, reference number '1' represents a symbol index of each slot, and the initial three symbols are assigned to a control information region. In addition, a reference signal (RS) is mapped in units of one resource block in a frequency domain, and the mapped resultant RS is repeatedly transmitted.

In FIG. 7, the number of OFDM symbols contained in one slot may be changed according to a cyclic prefix (CP) construction. FIG. 7(a) shows OFDM symbols for use with a normal CP. In FIG. 7(a), the number of OFDM symbols contained in one slot is 7. FIG. 7(b) shows OFDM symbols for use in the extended CP. In FIG. 7(b), the length of one OFDM symbol is increased, such that the number of OFDM symbols contained in one slot is less than that of a normal CP, for example, the number of OFDM symbols may be set to 6.

Reference elements (REs) 0, 1, 2 and 3 (where, 0, 1, 2, 3 and 4 represent R0, R1, R2 and R3 corresponding to RS per antenna port respectively) from among resource elements (REs) contained in the resource block (RB) shown in FIG. 7(a) or 7(b) represent cell-specific common reference signal (CRS) for four antenna ports. The REs 0, 1, 2 and 3 are adapted to measure a status of a channel transmitted through each antenna port 0, 1, 2 or 3 as well as to demodulate data transmitted to each port 0, 1, 2 or 3. Reference symbol 'D' represents a UE-specific dedicated reference signal (DRS), and is adapted to demodulate data transmitted over PDSCH. Information about the presence or absence of the DRS is transmitted to the UE via higher-layer signaling. This information corresponds to an effective resource element (RE) only in the case of a UE to which the corresponding PDSCH is allocated.

If the common reference signal (CRS) is mapped to time-frequency region resources, mapping of the CRS for one antenna port is performed at intervals of 6 REs in a frequency domain, and the CRS mapping result is transmitted at intervals of 6 REs. Therefore, one RB is composed of a total of 12 REs in a frequency domain, and two REs are used per antenna port.

On the other hand, RS mapping rules into resource block are following as Equation 12

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In equations 12 to 14, k and p mean subcarrier index and antenna port. And $N_{RB}^{DL}$, $n_s$, $N_{ID}^{cell}$ mean number of RB allocated for DL, slot index, cell ID. Note that given RS positioning depends on V-shift values in terms of frequency domain.

It is expected that the LTE-A system which is the standard of the next generation mobile communication system will support a coordinated multi point (CoMP) system, which is not supported in the existing standard, to improve a data transmission rate. In this case, the CoMP system means that a system in which two or more base stations or cells perform communication with a user equipment in cooperation with each other to improve communication throughput between a user equipment located in a shade zone and a base station (cell or sector).

The CoMP system can be classified into a CoMP-joint processing (CoMP-JP) system of cooperative MIMO type through data sharing and a CoMP-coordinated scheduling/beamforming (CoMP-CS/CB) system.

In case of the downlink, according to the CoMP-JP system, the user equipment can simultaneously receive data from each base station that performs CoMP, and can improve receiving throughput by combining signals received from each base station with one another. Unlike the CoMP-JP system, according to the CoMP-CS/CB system, the user equipment can receive data from one base station through beamforming.

In case of the uplink, according to the CoMP-JP system, each base station can simultaneously receive a PUSCH signal from the user equipment. Unlike the CoMP-JP system, according to the CoMP-CS/CB system, only one base station can receive a PUSCH. In this case, the CoMP-CS/CB system is determined by cooperative cells (or base stations).

MU-MIMO technology is that eNode B allocates each antenna resource to user equipments and schedule by selecting user equipment which can transmit at higher data rate per antenna. MU-MIMO technology improves system throughput.

Figure 8:
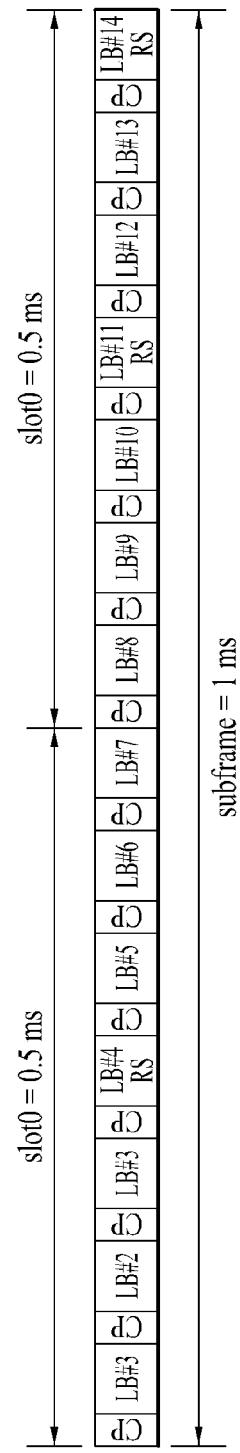
FIG. 8 illustrates an exemplary uplink subframe configuration including an SRS symbol.

FIG. 8 illustrates an exemplary uplink subframe configuration including an SRS symbol.

Referring to FIG. 8, the SRS, which are not associated with uplink data and/or control transmission, are primarily used for channel quality estimation to enable frequency-selective scheduling on the uplink. However, they can be used for other purposes such as to enhance power control or to support various start-up functions for UEs not recently scheduled. SRS is reference signal used for uplink channel, is pilot signal transmitted by eNode B to user equipment, and is used for measuring channel state between user equipment and eNode B. Channel for transmitting SRS may have different transmission bandwidth and transmission period per user equipment according to state of user equipment. The eNode B may determine that scheduling data channel of which user equipment in every subframe.

Some examples include initial Modulation and Coding Scheme (MCS) selection, initial power control for data transmissions, timing advance, and so-called frequency semi-selective scheduling in which the frequency resource is assigned selectively for the first slot of a subframe and hops pseudorandomly to a different frequency in the second slot.

An SRS can be used for downlink channel quality estimation under an assumption that a wireless channel is reciprocal between the uplink and downlink. This assumption is valid in a time division duplex (TDD) system where the uplink and downlink share the same frequency spectrum and are separated in time domain. Subframes in which SRSs are transmitted by a UE within a cell may be indicated by cell-specific broadcast signaling. A 4-bit cell-specific parameter 'srssubframeConfiguration' indicates 15 possible sets of subframes in which an SRS may be transmitted within each radio frame. This configuration provides flexibility in adjusting SRS overhead. As shown in FIG. 9, an SRS may be transmitted in the last SC-FDMA symbol in such configured subframes.

Thus, the SRS and DeModulation Reference Signal (DM RS) are located in different SC-FDMA symbols in a subframe. SRSs of a number of UEs that are transmitted in last SC-FDMA symbols of the same subframes can be discriminated according to the frequency locations. Since PUSCH data is not transmitted through an SC-FDMA symbol designated for SRS, every subframe has an SRS symbol in the worst case, causing a sounding overhead of 7%.

An SRS is generated using a Constant Amplitude Zero Auto Correlation (CAZAC) sequence or the like. SRSs transmitted from a number of UEs are CAZAC sequences $r^{SRS}(n)=r_{u,v}^{(\alpha)}(n)$ having different cyclic shift values $\alpha$ according to the following Equation 15. Here, $r^{SRS}(n)$ is an SRS sequence.

$$\alpha = 2\pi \frac{n_{SRS}^{cs}}{8} \qquad \text{[Equation 15]}$$

Here, $n_{SRS}^{cs}$ is a value set for each UE by the higher layer and has an integer value between 0 and 7. Each CAZAC sequence generated from one CAZAC sequence through cyclic shifting has zero correlation with other CAZAC sequences having cyclic shift values different from its cyclic shift value. Using these characteristics, SRSs of the same frequency region can be discriminated according to the sequence CAZAC sequence cyclic shift values. An SRS of each UE is allocated to a frequency according to a parameter set by the eNodeB. The UE performs frequency hopping of the SRS to allow the SRS to be transmitted over the overall uplink data transfer bandwidth.

As described above, a 3GPP LTE Release 8/9 system supports only periodic SRS transmission of UEs. This allows the eNodeB to estimate uplink channel quality of each UE. Here, the channel estimated by the eNodeB is used for functions such as frequency dependent scheduling, link level adaptation, timing estimation, and UL power control. The eNodeB may transmit an SRS uplink configuration to each UE through higher layer signaling (for example, RRC signaling) or the like in a UE-specific or cell-specific manner using an SRS parameter. The eNodeB may notify the UE of SRS uplink configuration information through an SRS uplink configuration information element message type as shown in the following Table 4.

TABLE 4

| SoundingRS-UL-Config information element |
|---|
| -- ASN1START |
| SoundingRS-UL-ConfigCommon ::=    CHOICE { |
|     release                                        NULL, |
|     setup                                          SEQUENCE { |

TABLE 4-continued

SoundingRS-UL-Config information element

```
        srs-BandwidthConfig              ENUMERATED {bw0, bw1, bw2, bw3, bw4, bw5, bw6, bw7},
        srs-SubframeConfig               ENUMERATED {
                                             sc0, sc1, sc2, sc3, sc4, sc5, sc6, sc7,
                                             sc8, sc9, sc10, sc11, sc12, sc13, sc14, sc15},
        ackNackSRS-SimultaneousTransmission  BOOLEAN,
        srs-MaxUpPts                     ENUMERATED {true}      OPTIONAL    -- Cond TDD
    }
}
SoundingRS-UL-ConfigDedicated ::=        CHOICE{
    release                              NULL,
    setup                                SEQUENCE {
        srs-Bandwidth                    ENUMERATED {bw0, bw1, bw2, bw3},
        srs-HoppingBandwidth             ENUMERATED (hbw0, hbw1, hbw2, hbw3),
        freqDomainPosition               INTEGER (0..23),
        duration                         BOOLEAN,
        srs-ConfigIndex                  INTEGER (0..1023),
        transmissionComb                 INTEGER (0..1),
        cyclicShift                      ENUMERATED {cs0, cs1, cs2, cs3, cs4, cs5, cs6, cs7}
    }
}
-- ASN1STOP
```

The following Table 5 shows SRS configuration parameters included in a SoundingRS-UL-Config information element message type in the above Table 4.

TABLE 5

| Sounding RS parameter name | Significance | Signalling type |
|---|---|---|
| srsBandwidthConfiguration | Maximum SRS bandwidth in the cell | Cell specific |
| srsSubframeConfiguration | Sets of subframes in which SRS may be transmitted in the cell | Cell-specific |
| srsBandwidth | SRS transmission bandwidth for a UE | UE-specific |
| frequencyDomainPosition | Frequency-domain position | UE-specific |
| srsHoppingBandwidth | Frequency hop size | UE-specific |
| Duration | Single SRS or periodic | UE-specific |
| srsConfigurationIndex | Periodicity and subframe offset | UE-specific |
| transmissionComb | Transmission comb offset | UE-specific |
| $i f^{CS}_{SRS}$ | Cyclic shift | UE-specific |

As shown in Tables 4 and 5, the SRS configuration information that the eNodeB provides to the UE may include, as SRS configuration parameters, an srsBandwidthConfiguration parameter, srsSubframeConfiguration parameter, an srsBandwidth parameter, a frequencyDomainPosition parameter, an SrsHoppingBandwidth parameter, a duration parameter, an srsConfigurationIndex parameter, and a transmissionComb parameter. The srsBandwidthConfiguration parameter represents maximum SRS bandwidth information in the cell and srsSubframeConfiguration parameter represents information of sets of subframes in which the UE may transmit an SRS in the cell. The eNodeB may notify the UE of the srsSubframeConfiguration parameter through cell-specific signaling. As shown in Table 4, the eNodeB may signal the srsSubframeConfiguration parameter in a 4-bit size (indicating sc0, sc1, sc2, sc3, sc4, sc5, sc6, sc7 sc8 sc9 sc10, sc11, sc12, sc13, sc14, and sc15) to the UE. The srsBandwidth parameter represents an SRS transmission bandwidth for the UE, the frequencyDomainPosition parameter represents a position in the frequency domain, the SrsHoppingBandwidth parameter represents an SRS frequency hop size, the duration parameter represents whether SRS transmission is single or periodic SRS transmission.

The srsConfigurationIndex parameter represents periodicity and a subframe offset (for example, a time unit corresponding to an interval between the first subframe and a subframe in which the first SRS is transmitted in a frame), and the transmissionComb parameter represents a transmission comb offset.

The eNodeB may notify the UE of the srsBandwidthConfiguration parameter and the srsSubframeConfiguration parameter through cell-specific signaling. On the contrary, the eNodeB may individually notify each UE of the srs-Bandwidth parameter, the frequencyDomainPosition parameter, the SrsHoppingBandwidth parameter, the duration parameter, the srsConfigurationIndex parameter, and the transmissionComb parameter through UE-specific signaling.

The 3GPP LTE Release 10 system supports aperiodic SRS transmission for more adaptive uplink channel quality estimation and more efficient use of SRS resources than the conventional system. A method for triggering aperiodic SRS transmission is currently under discussion. For example, the eNodeB may perform triggering using a DL/UL grant in a PDCCH. That is, the eNodeB may transmit an aperiodic SRS transmission triggering indicator for triggering aperiodic SRS transmission of the UE through a DL grant or a UL grant including the indicator or may transmit the indicator in a newly defined message format. The present invention will now be described with reference to an aperiodic SRS triggering grant (or aperiodic SRS triggering indicator) as an example of a message for triggering aperiodic SRS transmission of the UE.

In the present invention, the eNodeB may provide information regarding multiple aperiodic SRS configurations to the UE through higher layer signaling. The multiple aperiodic SRS configuration information transmitted by the eNodeB may include index information of a subframe in which an aperiodic SRS triggering grant is received or information such as information regarding a time relationship between a subframe in which an aperiodic SRS triggering grant is received and a subframe in which a corresponding aperiodic SRS is transmitted and information regarding resources for aperiodic SRS transmission. The present invention suggests that the UE selectively apply multiple aperiodic SRS configurations. Especially, the UE may adaptively switch aperiodic SRS configurations using the index information of a subframe in which an aperiodic SRS triggering grant is received or the time relationship between a subframe in which an aperiodic SRS triggering grant is received and a subframe in which a corresponding aperiodic SRS is transmitted.

Here, the number of aperiodic SRS configurations may vary depending on the basis of classification of the index of a subframe corresponding to the time point at which an aperiodic SRS triggering grant arrives or the definition of the time relationship between a subframe in which the aperiodic SRS triggering grant has been received and a subframe in which the corresponding aperiodic SRS has been transmitted. This method suggested in the present invention has an advantage in that the method does not require additional signaling for aperiodic SRS configuration switching and can also efficiently solve both the SRS coverage problem and the co-channel Heterogeneous Network (HetNet) uplink signal interference problem through adaptive aperiodic SRS configuration switching.

First, it is possible to consider that cell-specific periodic SRS resources, UE-specific aperiodic SRS resources, and UE-specific periodic SRS resources, which are defined in the 3GPP LTE Release 8/9 system, are reused as resources for aperiodic SRS transmission in the suggested method. Accordingly, this method decreases overhead required for signaling SRS resource position information and enables efficient use of SRS resources, compared to methods in which additional new aperiodic SRS resources are defined.

Aperiodic SRS configurations that the eNodeB transmits through higher layer signaling may be variously defined as parameters such as SRS bandwidth, comb, hopping bandwidth, and start Physical Resource Block (PRB) allocation have various values.

The suggested method has an advantage in that it is possible to more efficiently cope with changes in the state of an uplink channel between the eNodeB and the UE since whether or not aperiodic SRS transmission is performed is not only merely determined through the aperiodic SRS triggering grant but the UE also adaptively switches multiple aperiodic SRS configurations. Specifically, in a situation such as an HetNet situation, an appropriate aperiodic SRS configuration may vary according to the position of the UE. In order to cover this, the eNodeB needs to provide information regarding multiple aperiodic SRS configurations and information regarding resources of the multiple aperiodic SRS configurations and the processor 255 of the UE needs to appropriately select one of the multiple aperiodic SRS configurations and to operate accordingly. For example, the UE may use an aperiodic SRS configuration tied with a subframe in which a PDCCH including a UL grant (for example, a UL grant for triggering aperiodic SRS transmission or a UL grant for triggering PUSCH transmission) is received according to the received timing of the PDCCH.

The following is a description of the time point at which the UE transmits an aperiodic SRS. Assuming that the UE has received an aperiodic SRS triggering grant in subframe n (i.e., a subframe whose index is "n") of a specific frame, the time point at which the UE transmits an aperiodic SRS corresponds to, for example, a cell-specific periodic SRS subframe closest to the subframe n or a closest cell-specific periodic SRS subframe after subframe n+3. The UE may perform aperiodic SRS transmission not only through such cell-specific aperiodic SRS resources but also through UE-specific aperiodic SRS resources and UE-specific periodic SRS resources. The time point of aperiodic SRS transmission of the UE is not limited to these subframes.

In the case where aperiodic SRS transmission time points of different UEs overlap and available aperiodic SRS resources are insufficient, higher priority may be given to aperiodic SRS transmission taking into consideration aperiodic SRS bandwidths, aperiodic SRS transmission periods, and the like of the UEs.

Figure 9A:
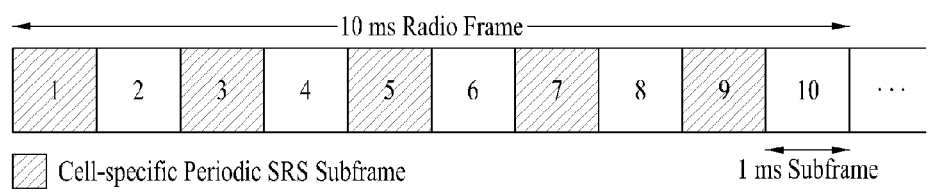
FIGS. 9A and 9B illustrate an exemplary subframe for cell-specific periodic SRS transmission and an exemplary subframe for UE-specific periodic SRS transmission.
Figure 9B:
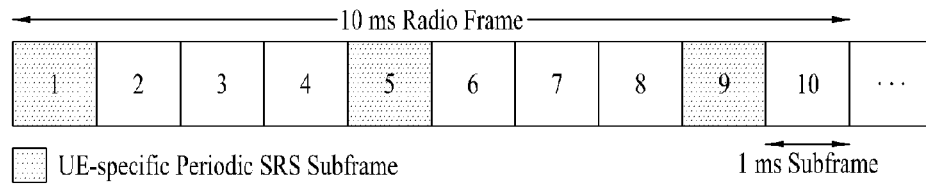

FIGS. 9A and 9B illustrate an exemplary subframe for cell-specific periodic SRS transmission and an exemplary subframe for UE-specific periodic SRS transmission.

As shown in FIG. 9A, the eNodeB may configure periodic SRS subframes (subframes 1, 3, 5, 7, and 9), which are slash-hatched in FIG. 9A, in the specific frame, at intervals of 2 ms according to a cell-specific periodic SRS configuration.

FIG. 9B shows a UE-specific periodic SRS configuration. The eNodeB may allocate a part of a subframe set including cell-specific periodic SRS subframes as a UE-specific periodic SRS subframe to a specific UE. As shown in FIG. 9B, for example, the eNodeB allocates periodic SRS subframes (subframes 1, 5, and 9) to a specific UE at intervals of 4 ms according to a UE-specific periodic SRS configuration. In this case, the specific UE to which the eNodeB has allocated the UE-specific periodic SRS subframe, may transmit periodic UE-specific SRSs in subframes of subframe indices 1, 5, and 9, which are dot-hatched in FIG. 9B, in the specific frame.

Figure 10A:
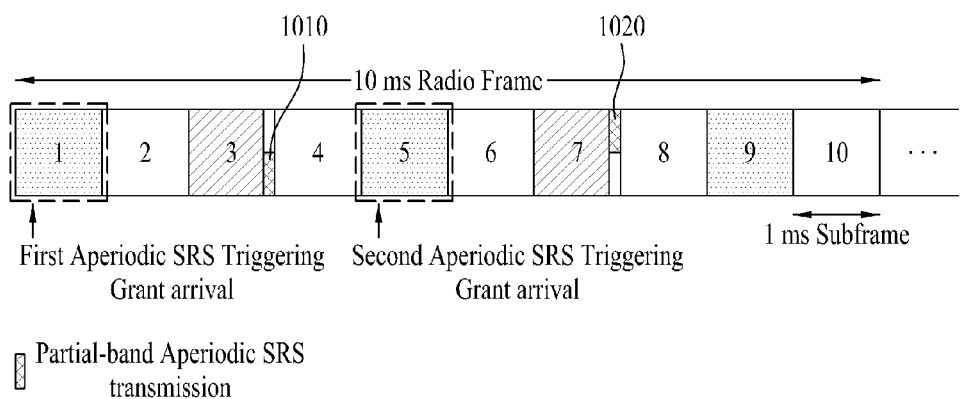
FIGS. 10A, 10B, and 10C illustrate exemplary operations for adaptively selecting multiple SRS configurations using a time relationship between a subframe in which an aperiodic SRS triggering grant is received and a subframe in which a corresponding aperiodic SRS is transmitted.
Figure 10B:
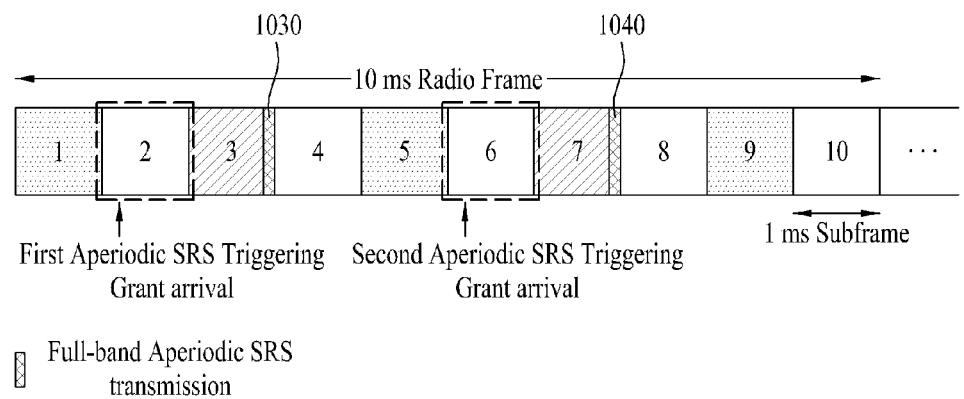
Figure 10C:
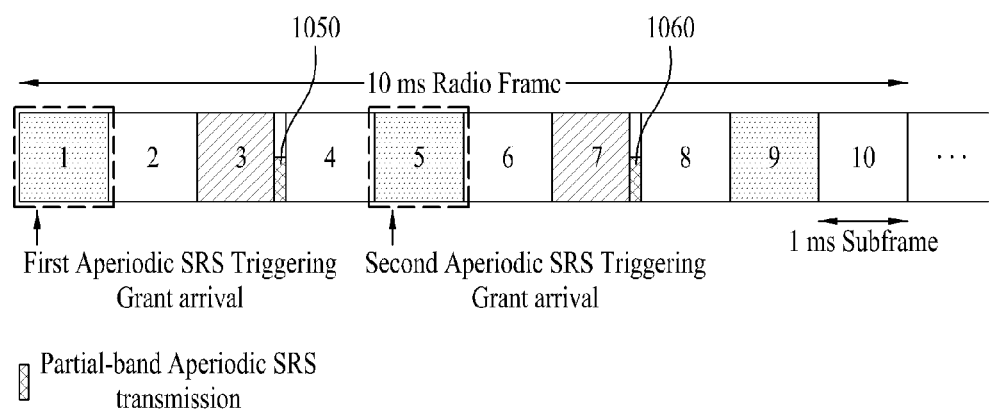

FIGS. 10A, 10B, and 10C illustrate exemplary operations for adaptively selecting multiple SRS configurations using a time relationship between a subframe in which an aperiodic SRS triggering grant is received and a subframe in which a corresponding aperiodic SRS is transmitted.

In FIGS. 10A, 10B, and 10C, it is assumed that the eNodeB has configured subframes 1, 3, 5, 7, and 9 as cell-specific periodic SRS subframes and has configured subframes 1, 5, and 9 as UE-specific periodic SRS subframes.

The eNodeB may set multiple aperiodic SRS configurations and notify a UE of the aperiodic SRS configurations. Here, these aperiodic SRS configurations are referred to as a first aperiodic SRS configuration and a second aperiodic SRS configuration. The eNodeB notifies the UE of information regarding such multiple aperiodic SRS configurations through higher layer signaling. The aperiodic SRS configuration information may include information regarding the time point at which the UE transmits an aperiodic SRS and information regarding resources for aperiodic SRS transmission. For example, the time point at which the UE transmits an aperiodic SRS may be a cell-specific periodic SRS subframe which is closest to (or earliest from) subframe n in which an aperiodic SRS triggering grant is received or a cell-specific periodic SRS subframe which first comes after subframe n+3. In addition, a periodic SRS may be transmitted not only through a cell-specific SRS resource but also through a UE-specific aperiodic SRS resource and a UE-specific SRS periodic resource. The present invention is described as follows, for example, assuming that the aperiodic SRS configuration has been set such that the time point at which the UE transmits an aperiodic SRS is a cell-specific periodic SRS subframe which is closest to a subframe (subframe n) in which an aperiodic SRS triggering grant is received. In the following description, it is also assumed that a cell-specific periodic SRS transmission subframe is set at intervals of, for example, 2 ms as illustrated in FIG. 9A.

The second SRS configuration is set such that the UE transmits an aperiodic SRS in subframe n+2 in response to an aperiodic SRS triggering grant received in subframe n (n=1, 2, . . . ). The first SRS configuration is set such that the UE transmits an aperiodic SRS in subframe n+2 in response to an aperiodic SRS triggering grant received in subframe n+1. In this manner, the processor 255 of the UE may select a specific SRS configuration from multiple SRS configurations based on a time relation between a subframe in which an aperiodic SRS triggering grant is received and a corresponding aperiodic SRS transmission subframe and may perform an operation corresponding to the selected SRS configuration. Here, for example, let us assume that one frame includes 10 subframes and subframe indices 1 to 10 are assigned respectively to the 10 subframes included in one frame.

Referring to FIG. 10A, according to the second aperiodic SRS configuration, the UE may be configured such that, when the time relation between a subframe in which an aperiodic SRS triggering grant is received and a corresponding aperiodic SRS transmission subframe (i.e., the index difference between the subframe in which the aperiodic SRS triggering grant is received and the corresponding aperiodic SRS transmission subframe) is 2, the UE transmits an aperiodic SRS for an aperiodic SRS triggering grant received in subframe n (n=1, 2, through a partial band (for example, through a partial band in the frequency axis of subframe n+2). In this case, the difference between a time point at which an aperiodic SRS triggering grant is received and a time point at which an aperiodic SRS is to be transmitted is 2 in this case. That is, when the UE is configured such that an aperiodic SRS transmission triggering grant is received in subframe 1 and an aperiodic SRS is transmitted in subframe 3, the UE may transmit an aperiodic SRS through a partial band 1010 of subframe 3. Similarly, when the UE is configured such that an aperiodic SRS transmission triggering grant is received in subframe 5 and an aperiodic SRS is transmitted in subframe 7, the UE may transmit an aperiodic SRS through a partial band 1020 of the subframe 7.

On the other hand, referring to FIG. 10B, according to the first aperiodic SRS configuration, the UE may be configured such that, when the time relation between a subframe in which an aperiodic SRS triggering grant is received and a corresponding aperiodic SRS transmission subframe (i.e., the index difference between the subframe in which the aperiodic SRS triggering grant is received and the corresponding aperiodic SRS transmission subframe) is 1, the UE transmits an aperiodic SRS for an aperiodic SRS triggering grant received in subframe n+1 (n=1, 2, . . . ) through a full band 1030 and 1040 (for example, through a full band in the frequency axis of the subframe n+2).

The term "partial-band SRS transmission" refers to transmission of an SRS using part of the band of a subframe allocated for SRS transmission and the term "full-band SRS transmission" refers to transmission of an SRS using the entirety of the band of a subframe allocated for SRS transmission.

Full-band aperiodic SRS transmission may be selected when an uplink channel between the eNodeB and the UE is in a good condition. For example, a UE adjacent to the eNodeB or a macro UE (MUE) that is distant from a home eNodeB (HeNB) that uses the same transmission band as a macro eNodeB (MeNB) may perform a full-band aperiodic SRS transmission operation. On the other hand, partial-band aperiodic SRS transmission may be selected when an uplink channel between the eNodeB and the UE is in a bad condition. For example, a UE located at a cell edge or to an MUE, which is located within or near the area of a HeNB that uses the same transmission band as an MeNB and transmits an uplink signal, may perform a partial-band aperiodic SRS transmission operation.

The processor 255 of the UE may adaptively and flexibly switch between the first and second SRS aperiodic configurations suggested in the present invention based on the current network state and communication environments and the time point at which an aperiodic SRS triggering grant has been received, thereby efficiently coping with both the SRS coverage problem and the co-channel HetNet uplink signal interference problem.

Especially, the second aperiodic SRS configuration shown in FIG. 10A is set based on a partial-band aperiodic SRS transmission scheme in which aperiodic SRSs are transmitted through frequency hopping partial bands 1010 and 1020. In this scheme, the UE may focus its transmission power on part of the entire SRS resource region, thereby efficiently solving the SRS coverage problem.

According to the first aperiodic SRS configuration shown in FIG. 10B, when the UE is configured such that the UE transmits an aperiodic SRS transmission triggering grant in subframe 2 and transmits an aperiodic SRS in subframe 3, the UE may transmit an aperiodic SRS through a full band 1030 of subframe 3. Similarly, when the UE is configured such that the UE transmits an aperiodic SRS transmission triggering grant in subframe 6 and transmits an aperiodic SRS in subframe 7, the UE may transmit an aperiodic SRS through a full band 1040 of subframe 7.

An aperiodic SRS configuration shown in FIG. 10C may be set in a non-frequency-hopping scheme in order to solve the co-channel HetNet uplink signal interference problem although the aperiodic SRS configuration is set based on a partial-band aperiodic SRS transmission scheme, similar to the second aperiodic SRS configuration. Here, orthogonal fixed partial bands 1050 and 1060 are specified as uplink signal transmission bands for a macro UE and a home UE.

Each of the first aperiodic SRS configuration and the second aperiodic SRS configuration may be defined as one of combinations of the configurations of FIGS. 10A and 10B or FIGS. 10B and 10C. The eNodeB may provide the defined combination information and/or selected combination information to the UE through higher layer signaling.

Figure 11:
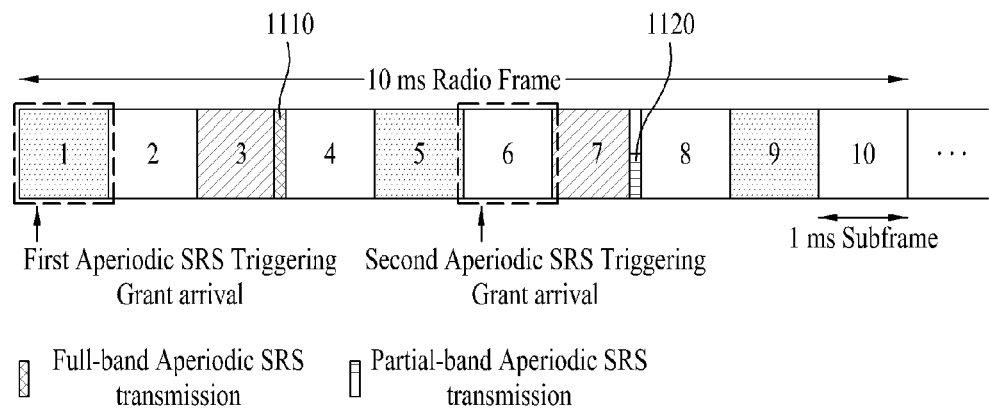
FIG. 11 illustrates an aperiodic SRS operation performed when classification of the index of a subframe corresponding to the time point at which an aperiodic SRS triggering grant arrives is applied according to a different basis.

FIG. 11 illustrates an aperiodic SRS operation performed when classification of the index of a subframe corresponding to the time point at which an aperiodic SRS triggering grant arrives is applied according to a different basis.

Referring to FIG. 11, let us assume that the eNodeB has allocated subframes 1, 3, 5, 7, and 9 as cell-specific periodic SRS subframes and has allocated subframes 1, 5, and 9 as UE-specific periodic SRS subframes to a specific UE. According to the aperiodic SRS configuration shown in FIG. 11, the processor 255 of the UE may select the first aperiodic SRS configuration from among multiple SRS configurations when the index of a subframe in which an aperiodic SRS triggering grant has arrived is odd (n=1, 3, 5, . . . , 9) (in the case in which the first subframe is indexed by 1) and may select the second aperiodic SRS configuration when the index of a subframe in which an aperiodic SRS triggering grant has arrived is even.

For example, if the UE receives an aperiodic SRS transmission triggering grant in subframe 1 which is an odd index subframe, the UE may transmit an aperiodic SRS through a full band 1110 in subframe 3 which is a cell-specific aperiodic SRS subframe closest to subframe 1. In addition, if the UE receives an aperiodic SRS transmission triggering grant in subframe 6 which is an even index subframe, the UE may transmit an aperiodic SRS through a full band 1120 in subframe 7 which is a cell-specific aperiodic SRS subframe closest to subframe 6.

In another embodiment of FIG. 11, when a UE-specific periodic SRS subframe index that the eNodeB has allocated to a specific UE in a specific frame is n (for example, n=1, 5, 9), subframes in which an aperiodic SRS triggering grant is received are divided into a subframe corresponding to a time point of n−4 and subframes corresponding to time points other than n−4. Here, the time point "n−4" may be variously defined based on other values.

In FIG. 11, if the UE receives an aperiodic SRS triggering grant in a subframe whose subframe index is 1 (i.e., a first subframe or subframe 1), the UE may perform an SRS transmission operation through a full band 1110 in subframe 3 which is a closest or earliest cell-specific SRS subframe subsequent to the subframe 1 since the subframe 1 corresponds to a time point n−4 with respect to a subframe whose subframe index is 5 (i.e., subframe 5). In addition, if the UE receives an aperiodic SRS triggering grant in a subframe whose subframe index is 6 (i.e., subframe 6), the UE may perform an SRS transmission operation through a partial band 1120 in subframe 7 which is a cell-specific SRS subframe closest to the subframe 6 since the subframe 6 does not correspond to a time point n−4 with respect to a subframe whose subframe index is 9 (i.e., subframe 9).

In the case where the UE has received an aperiodic SRS triggering grant in a subframe corresponding to a time point of n−4, the UE may operate in a full-band aperiodic sounding manner, i.e., according to the third aperiodic SRS configuration. Otherwise, the UE may operate in a partial-band aperiodic sounding manner, i.e., according to the fourth aperiodic SRS configuration. In common with the first and second aperiodic SRS configurations, these schemes have a feature that the UE transmits an aperiodic SRS through a cell-specific periodic SRS subframe closest to a subframe in which an aperiodic SRS triggering grant is received. The third and fourth aperiodic SRS configurations may be set by the eNodeB and the eNodeB may notify the UE of the third and fourth SRS configurations through higher layer signaling.

Figure 12A:
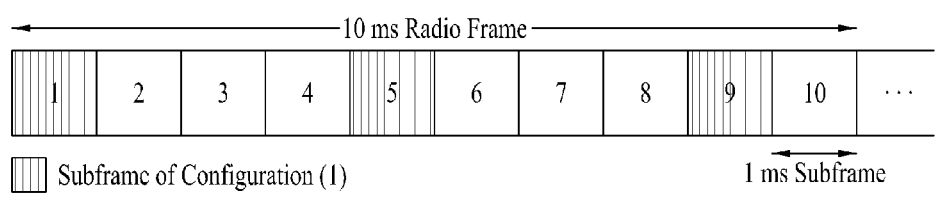
FIGS. 12A and 12B illustrate exemplary aperiodic SRS subframes of SRS configurations.
Figure 12B:
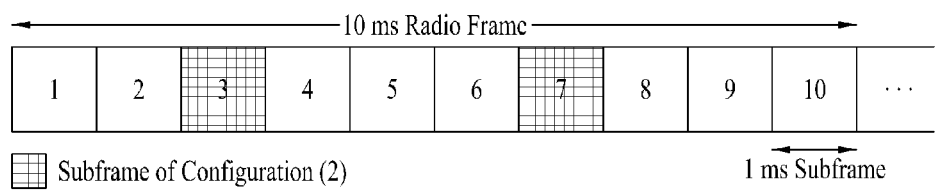

FIGS. 12A and 12B illustrate exemplary SRS subframes of aperiodic SRS configurations.

Referring to FIG. 12A, the eNodeB may set a fifth aperiodic SRS configuration such that the UE transmits aperiodic SRSs through partial bands of subframes whose indices are 1, 5, and 9. According to the fifth aperiodic SRS configuration, the UE may transmit SRSs in subframes 1, 5, and 9 through partial bands of the subframes 1, 5, and 9 since an SRS transmission period and a subframe offset are 4 ms and 0 ms, respectively, as shown in FIG. 12A.

Referring to FIG. 12B, the eNodeB may set a sixth aperiodic SRS configuration such that the UE transmits aperiodic SRSs through full bands of subframes whose indices are 3, and 7. According to the sixth aperiodic SRS configuration, the UE may transmit SRSs in subframes 3, and 7 through full bands of the subframes 3, and 7 since an SRS transmission period and a subframe offset are 4 ms and 2 ms, respectively, as shown in FIG. 12B. Here, in the fifth and sixth aperiodic SRS configurations, the period of subframes in which aperiodic SRSs are transmitted may be specified to be the same as or a multiple of the period of cell-specific periodic SRS subframes since resources for cell-specific periodic SRS transmission are reused as resources for aperiodic SRS transmission subframes. The eNodeB may notify the UE of the first and sixth aperiodic SRS configuration information (including information regarding an SRS transmission subframe according to the fifth and sixth SRS configurations) through higher layer signaling.

Figure 13:
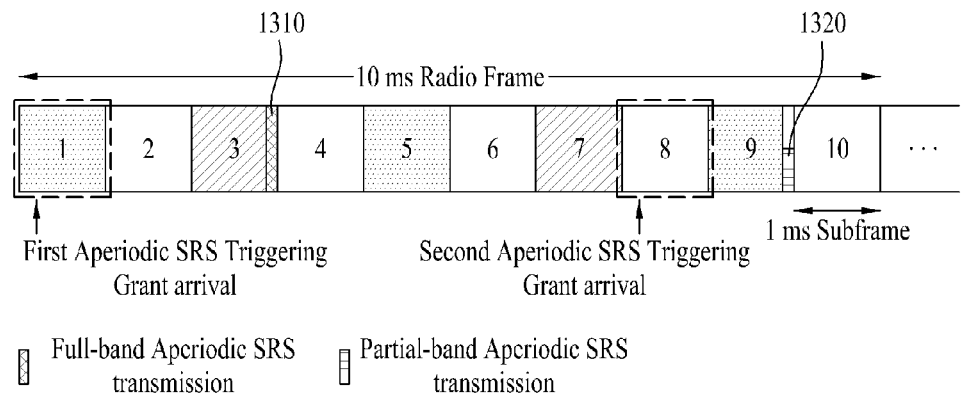
FIG. 13 illustrates switching of aperiodic SRS configurations according to a time point at which a UE receives an aperiodic SRS triggering grant and the aperiodic SRS configurations of FIGS. 12A and 12B.

FIG. 13 illustrates switching of aperiodic SRS configurations according to a time point at which a UE receives an aperiodic SRS triggering grant and the aperiodic SRS configurations of FIGS. 12A and 12B.

In the case where the UE performs aperiodic SRS transmission through a cell-specific periodic SRS subframe closest to a subframe in which an aperiodic SRS triggering grant is received, the UE may perform aperiodic SRS transmission differently according to the SRS configuration of the closest cell-specific periodic SRS subframe in which an aperiodic SRS is transmitted.

For example, as shown in FIG. 13, the cell-specific periodic SRS configuration is set such that subframes 1, 3, 5, 7, and 9 are allocated as periodic SRS transmission subframes. The eNodeB may allocate subframes 1, 5, and 9 as UE-specific periodic SRS transmission subframes. When the UE has received an aperiodic SRS triggering grant in subframe 1, the UE may transmit an aperiodic SRS through subframe 3 which is a cell-specific periodic SRS subframe closest to the subframe 1. Here, since cell-specific aperiodic SRS subframe 3 which is closest to the time point at which an aperiodic SRS triggering grant is received corresponds to a subframe which is configured according to the sixth aperiodic SRS configuration in FIG. 12B, the UE may transmit an aperiodic SRS through a full band 1310 of the subframe 3. In another embodiment, the UE may transmit an aperiodic SRS through a full band 1310 of the subframe 3 since the subframe 1, in which the UE has received the aperiodic SRS triggering grant, corresponds to a time point of n−4 with respect to the subframe 5 which is a cell-specific periodic SRS subframe, similar to the third SRS configuration.

In addition, when the UE has received an aperiodic SRS triggering grant in subframe 8, the UE may transmit an aperiodic SRS through subframe 9 which is a cell-specific periodic SRS subframe closest to the subframe 8. Here, since cell-specific aperiodic SRS subframe 9 which is closest to the time point at which an aperiodic SRS triggering grant is received is a subframe which is configured according to the fifth aperiodic SRS configuration shown in FIG. 12A, the UE may transmit an aperiodic SRS through a partial band 1320 of the subframe 9. In another embodiment, the UE may transmit an aperiodic SRS through a partial band 1320 of the subframe 3 since the subframe 8, in which the UE has received the aperiodic SRS triggering grant, does not correspond to a time point of n−4 with respect to the subframe 9 which is a cell-specific periodic SRS subframe, similar to the fourth SRS configuration.

The subframe 9 is allocated as a UE-specific periodic SRS subframe such that the subframe 9 is basically used to perform periodic SRS transmission. However, exceptionally, the UE may cancel periodic SRS transmission and transmit an aperiodic SRS when the subframe 9 overlaps an aperiodic SRS transmission time point.

Figure 14A:
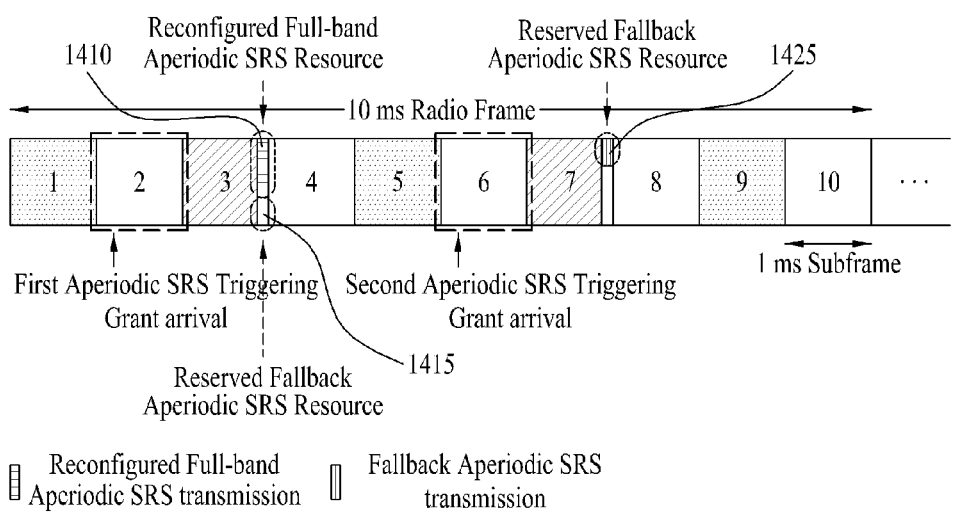
FIGS. 14A and 14B illustrate fallback aperiodic SRS transmission.
Figure 14B:
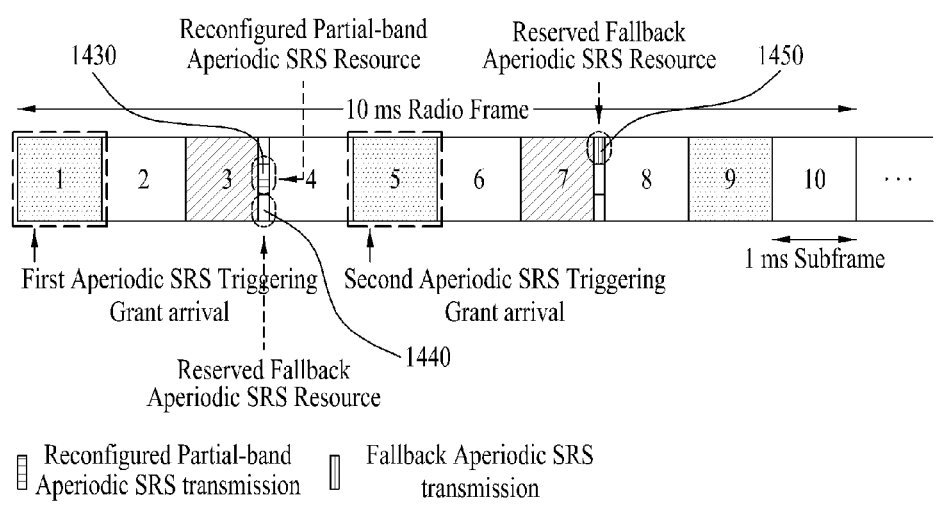

FIGS. 14A and 14B illustrate fallback aperiodic SRS transmission.

A seventh aperiodic SRS configuration and an eighth aperiodic SRS configuration shown respectively in FIGS. 14A and 14B are set such that the UE transmits an aperiodic SRS through a full band or a partial band using the time difference between a time point (for example, a subframe index) at which an aperiodic sRS transmission triggering grant has been received and a time point at which an aperiodic SRS transmission time is to be transmitted.

The eNodeB may allocate SRS subframes according to a seventh aperiodic SRS configuration as shown in FIG. 14A. The seventh aperiodic SRS configuration is set such that aperiodic SRSs are transmitted through full bands similar to the aperiodic SRS triggering scheme (i.e., the first SRS configuration scheme) shown in FIG. 10B. However, in the seventh aperiodic SRS configuration, a conventional aperiodic SRS resource, which is used through a full band thereof, is divided into a reconfigured full-band aperiodic SRS resource 1410 and a fallback aperiodic SRS resource 1415.

As shown in FIG. 14A, a partial reduced resource block (RB) region 1415 of the allocated full-band aperiodic SRS resource 1410 may be used as the fallback aperiodic SRS resource 1415. Alternatively, the aperiodic SRS resource 1415 may be predefined as a resource region disjointed from the full-band aperiodic SRS resource.

The scheme expressed by "fallback aperiodic SRS resource" in FIGS. 14A and 14B indicates both the fallback aperiodic SRS resource allocation schemes described above (i.e., the "reconfigured full-band aperiodic SRS resource" scheme and the "fallback aperiodic SRS resource" scheme) rather than one of the two fallback aperiodic SRS resource allocation schemes. In addition, the fallback aperiodic SRS resource 1415 may occupy a resource region smaller than the reconfigured full-band aperiodic SRS resource 1410 and the fallback aperiodic SRS resources 1415 and 1425 may be allocated in a frequency hopping pattern for each SRS transmission subframe.

The UE performs switching between the reconfigured full-band aperiodic SRS resource and the fallback aperiodic SRS resource in the following manner. The processor 255 of the UE compares the currently available amount of power with the amount of power required to successfully transmit an aperiodic SRS through the reconfigured full-band aperiodic SRS resource 1410. The processor 255 transmits an SRS through the reconfigured full-band aperiodic SRS resource 1410 when the currently available amount of power is sufficient and falls back to the fallback aperiodic SRS resource 1415 and transmits an SRS through the fallback aperiodic SRS resource 1415 when the currently available amount of power is insufficient. Here, since switching to the fallback aperiodic SRS resource 1415 is performed according to determination of the processor 255 of the UE, the eNodeB needs to find a resource region, in which an aperiodic SRS has been transmitted, through blind decoding.

The processor 255 of the UE may determine whether or not transmission power is sufficient and then may transmit an SRS through a reconfigured full-band aperiodic SRS resource 1410 in subframe 3 upon determining that transmission power is sufficient. In addition, the UE may receive an aperiodic SRS triggering grant in subframe 6 and, when the processor 255 of the UE determines that transmission power is insufficient, the UE may switch the SRS transmission scheme to the fallback aperiodic SRS transmission scheme in subframe 7 to transmit an aperiodic SRS through a fallback aperiodic SRS resource 1415. This operation may also be applied to a partial-band aperiodic sounding scheme.

The eNodeB may configure SRS subframes as shown in FIG. 14B according to an eighth aperiodic SRS configuration. The eighth aperiodic SRS configuration is an aperiodic SRS transmission scheme in which a partial-band aperiodic SRS resource is divided into a reconfigured partial-band aperiodic SRS resource 1430 and a fallback aperiodic SRS resource 1440 as shown in FIG. 14B. Here, the aperiodic SRS triggering method follows the same scheme as the scheme (i.e., the second SRS configuration scheme) used in FIG. 10A and the fallback aperiodic SRS resource 1440 may be predefined as a resource region disjointed from the partial band aperiodic SRS resource 1430 as shown in FIG. 14B. A partial reduced resource block (RB) region of the allocated partial-band aperiodic SRS resource may also be used as the fallback aperiodic SRS resource 1440.

As shown in FIG. 14B, the UE may receive an aperiodic SRS triggering grant in subframe 1 and the processor 255 of the UE may determine whether or not transmission power is sufficient. Then, upon determining that transmission power is sufficient, the UE may sufficiently perform SRS transmission through a partial-band aperiodic SRS resource 1430 using the transmission power. In addition, the UE may receive an aperiodic SRS triggering grant in subframe 5 and, when the processor 255 of the UE determines that transmission power is insufficient, the UE may switch the SRS transmission scheme to the fallback aperiodic SRS transmission scheme and transmit an aperiodic SRS through a fallback aperiodic SRS resource 1450 of subframe 7. In this case, the UE may perform aperiodic SRS transmission through a fallback aperiodic SRS resource 1450. Accordingly, the UE can adaptively fall back to an alternative aperiodic SRS resource to efficiently solve the SRS coverage problem. Then, when the UE transmits an aperiodic SRS through a fallback aperiodic SRS resource, the eNodeB needs to search for a resource region, in which an aperiodic SRS has been transmitted, through blind decoding. In the above example, the processor 255 of the UE determines whether or not to switch fallback aperiodic SRS schemes by determining whether or not power is sufficient. However, the UE may also operate according to a fallback aperiodic SRS scheme for a specific band upon receiving adjacent cell interference notification information such as information indicating that the serving cell receives, from an adjacent cell, strong interference in the specific band. For example, if uplink SRS transmission causes strong interference to cell B when UE A located at an edge of adjacent cell A transmits an SRS in a specific band of subframe 1, cell B may provide signaling (for example, 1-bit signaling) such as information instructing a UE in cell B to transmit an aperiodic SRS through a fallback aperiodic SRS resource taking into uplink interference. Then, the UE in cell B may transmit an SRS through a fallback aperiodic SRS resource in subframe 1 based on such signaling. Cell A and cell B may exchange information regarding such uplink interference through a backhaul or the like and allocate SRS resources of the UE in the cell taking into consideration uplink interference according to SRS transmission of the adjacent cell.

Figure 15A:
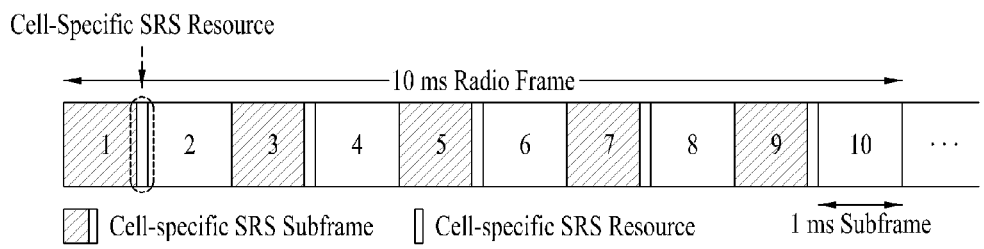
FIGS. 15A to 15C illustrate a method in which cell-specific SRS resources are reused for efficient aperiodic SRS transmission when cell-specific SRS resources (subframes) are allocated at intervals of 2 ms.
Figure 15B:
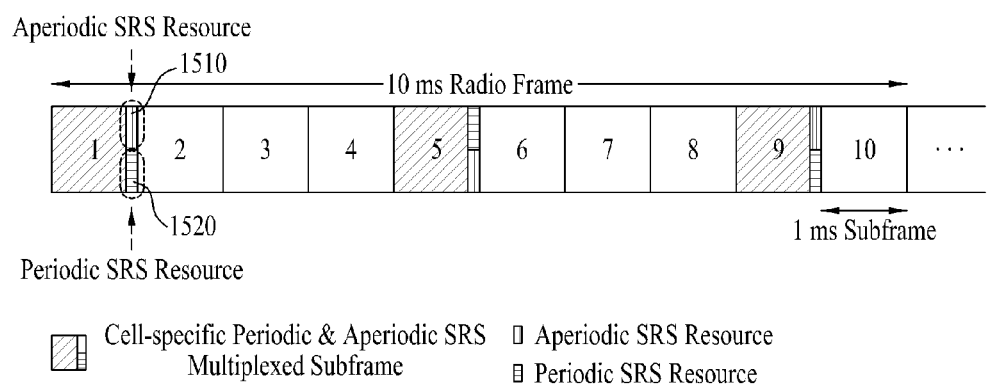
Figure 15C:
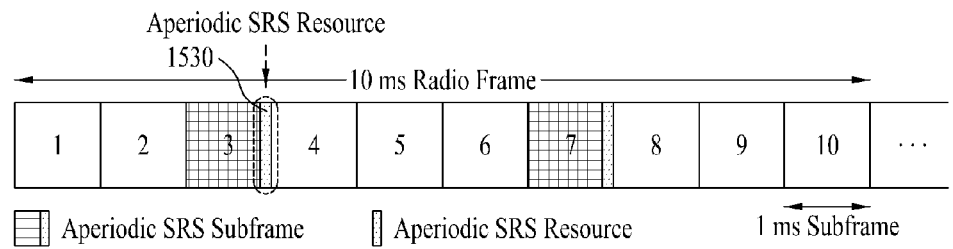

FIG. 15A illustrates a cell-specific SRS subframe configuration and a cell-specific SRS resource configuration, FIG. 15B illustrates an SRS configuration in which a cell-specific periodic SRS resource and a cell-specific aperiodic SRS resource are multiplexed, and FIG. 15C illustrates an exemplary aperiodic SRS subframe configuration.

Referring to FIG. 15A, the eNodeB may configure subframes 1, 3, 5, 7, and 9 as cell-specific SRS subframes at intervals of 2 ms according to a preset rule and allocate cell-specific SRS resources accordingly. The UE may transmit an aperiodic SRS through an aperiodic SRS subframe or a subframe in which a cell-specific periodic SRS resource and a cell-specific aperiodic SRS resource are multiplexed.

Referring to FIGS. 15B and 15C, from among the cell-specific SRS subframes configured in FIG. 15A, the eNodeB may separately configure subframes such as subframes 1, 5, and 9 in which cell-specific periodic and aperiodic SRS resources are multiplexed and 'periodic SRS subframes' such as subframes 3 and 7. Here, in this scheme, the subframes in which cell-specific periodic and aperiodic SRS resources are multiplexed are used while the cell-specific SRS resources are divided into a 'periodic SRS resource' 1510 and an 'aperiodic SRS resource' 1520.

In one cell-specific SRS resource division method, a cell-specific SRS resource is divided into two orthogonal regions (for example, 2 subbands). In an alternative method, an entire set including pairs (or sets) of available combs and cyclic shifts may be divided into two subsets and a periodic SRS resource and an aperiodic SRS resource may be allocated respectively to the two subsets. In the latter method, for example, two available combs may be divided into a comb for full-band sounding and a comb for partial-band sounding and then 8 cyclic shifts that can be combined with each comb may be divided into two halves, each including 4 cyclic shifts, and the two halves may then be allocated as a periodic SRS resource and an aperiodic SRS resource, respectively.

For example, UE A may transmit an aperiodic SRS through an aperiodic SRS resource 1520 in subframe 1 while UE B transmits a periodic SRS through a periodic SRS resource 1510 in subframe 1. That is, the aperiodic SRS of the UE A and the periodic SRS of UE B may be multiplexed and transmitted in subframe 1. Here, one UE may multiplex and transmit an aperiodic SRS and a periodic SRS in subframe 1 by applying different combs to a periodic SRS and an aperiodic SRS, thereby increasing the efficiency of channel estimation of a specific bandwidth.

Referring to FIG. 15C, in subframes 3 and 7 among the cell-specific SRS subframes configured in FIG. 15A, the eNodeB may allocate resources for aperiodic SRS transmission through a full band 1530.

As shown in FIGS. 15B and 15C, the eNodeB may alternately allocate cell-specific SRS subframes as a subframe in which cell-specific periodic and aperiodic SRS resources are multiplexed and an aperiodic SRS subframe. For example, the eNodeB may configure cell-specific SRS subframes such that cell-specific periodic and aperiodic SRS resources are multiplexed in cell-specific SRS subframe 1, subsequent cell-specific SRS subframe 3 is used as an aperiodic SRS subframe, and cell-specific periodic and aperiodic SRS resources are multiplexed in subsequent cell-specific SRS subframe 5 (ninth aperiodic SRS configuration). A rule used in this case may be defined variously using a number of methods. In the example of FIG. 15B, a cell-specific SRS resource is not necessarily divided into periodic and aperiodic SRS resources using one of the two cell-specific SRS resource division methods and a cell-specific SRS resource may also be divided into periodic and aperiodic SRS resources using both the SRS resource division methods.

In addition, when aperiodic SRS transmission in a subframe in which cell-specific periodic and aperiodic SRS resources are multiplexed has been requested, the UE may transmit SRSs through a specified aperiodic SRS resource. The eNodeB may predefined and allocate resources for aperiodic SRS transmission of UEs since each UE does not know when an aperiodic SRS triggering indicator (for example, a grant) is received. Each subframe in which cell-specific periodic and aperiodic SRS resources are multiplexed has been basically configured such that periodic SRS transmission is performed in the subframe. However, exceptionally, the UE may cancel periodic SRS transmission and preferentially perform aperiodic SRS transmission when the subframe overlaps an aperiodic SRS transmission time point.

Figure 16:
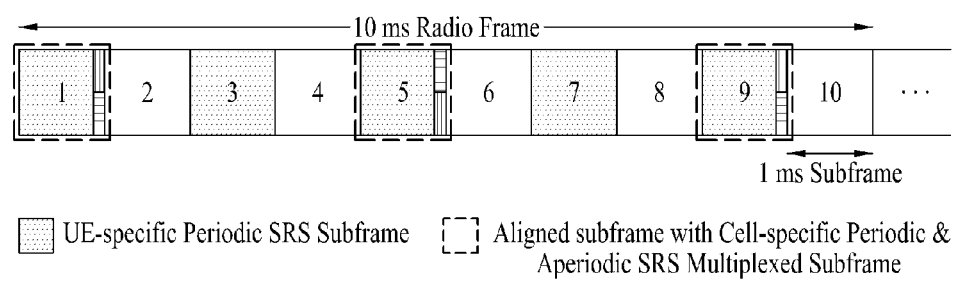
FIG. 16 illustrates a configuration of a UE-specific periodic SRS subframe.

FIG. 16 illustrates a configuration of a UE-specific periodic SRS subframe.

The eNodeB may allocate an SRS transmission subframe to a specific UE as shown in FIG. 16 according to a 10th SRS configuration. In the 10th SRS configuration, UE-specific periodic SRS subframes are allocated at intervals of 2 ms in a specific frame. For example, subframes 1, 3, 5 7, and 9 are allocated as UE-specific periodic SRS subframes in a specific frame. Some subframes among UE-specific periodic SRS subframes may be configured as subframes in which cell-specific periodic and aperiodic SRS resources are multiplexed as denoted by dashed lines in FIG. 16. Although cell-specific periodic and aperiodic SRS resources in subframes denoted by dashed lines in FIG. 16 are illustrated as being multiplexed according to a Frequency Division Multiplexing (FDM) scheme, the multiplexing method is not limited to FDM. Cell-specific periodic and aperiodic SRSs may be multiplexed and transmitted in subframes 1, 5, and 9. For example, in subframes 1, 5, and 9, the UE A may transmit a cell-common periodic SRS and the UE B may transmit a periodic SRS. Alternatively, in subframes 1, 5, and 9, the UE A may multiplex an aperiodic SRS and a periodic SRS in one subframe to simultaneously transmit the aperiodic SRS and the periodic SRS in the subframe. The period of periodic SRS subframes that are allocated in a cell-specific manner may be set to be the same as or a multiple of the period of cell-specific periodic and aperiodic SRS multiplexed subframes.

Figure 17A:
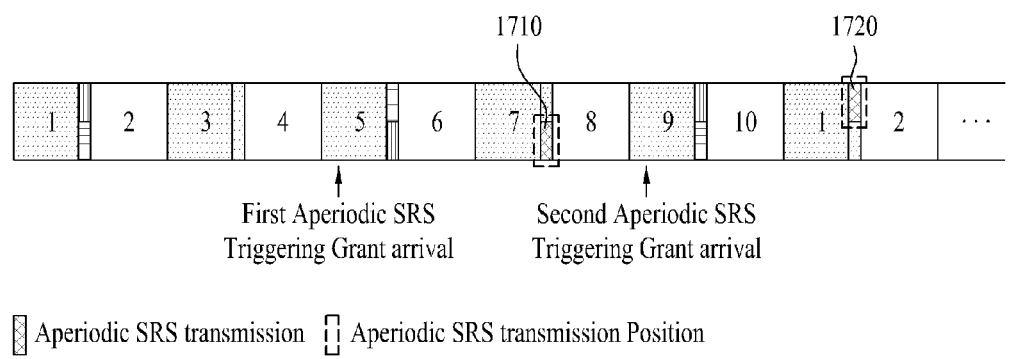
FIGS. 17A to 17(c) illustrate an operation for dynamically selecting multiple SRS configurations using a time relationship between a subframe in which an aperiodic SRS triggering grant is received and a subframe in which a corresponding aperiodic SRS is transmitted.
Figure 17B:
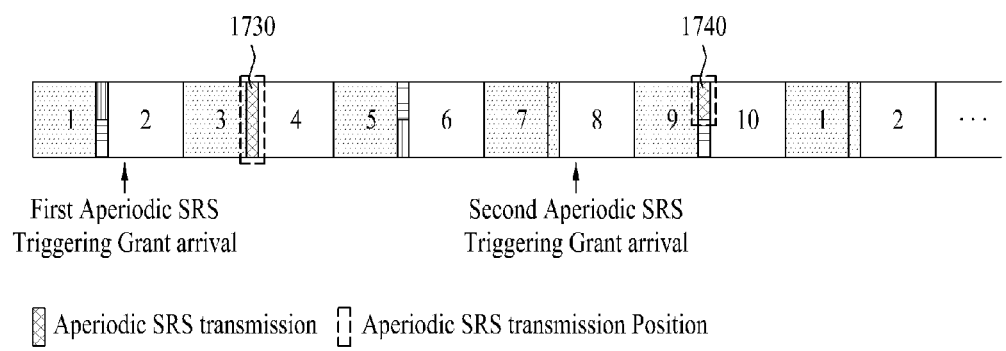
Figure 17C:
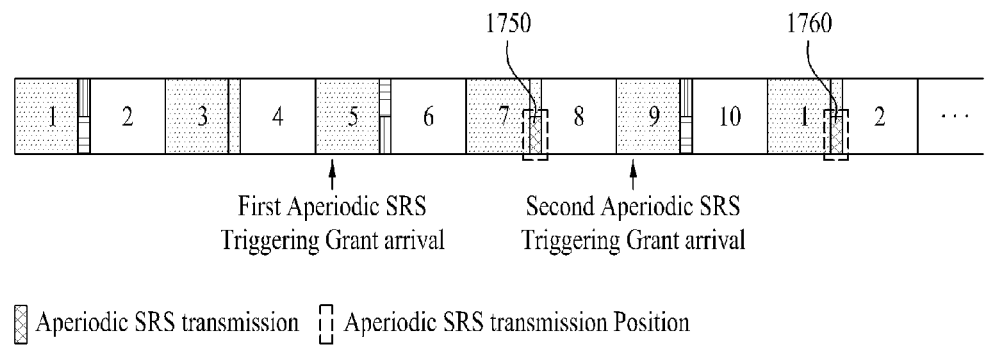

FIGS. 17A to 17(c) illustrate an operation for dynamically selecting multiple SRS configurations using a time relationship between a subframe in which an aperiodic SRS triggering grant is received and a subframe in which a corresponding aperiodic SRS is transmitted.

Here, the UE has two types of aperiodic SRS configurations which are referred to as an 11th SRS configuration and a 12th SRS configuration. In addition, let us assume that a time point at which the UE transmits an aperiodic SRS is specified to be a closest (or earliest) cell-specific SRS subframe subsequent to a subframe in which an aperiodic SRS triggering grant is received and the period of cell-specific SRS subframes is set to 2 ms.

The eNodeB may allocate SRS subframes as shown in FIG. 17A according to the 11th SRS configuration. In the case where the UE has received an aperiodic SRS triggering grant in subframe n (for example, n=5, 9), the processor 255 of the UE may select the 11th SRS configuration and the UE may transmit aperiodic SRSs in subframe n+2 (i.e., n+2=7, 1) through partial bands 1710 and 1720 according to the 11th SRS configuration. In the 11th SRS configuration, the partial bands 1710 and 1720 through which the UE transmits aperiodic SRSs are configured in a frequency hopping manner.

The eNodeB may allocate SRS subframes as shown in FIG. 17B according to the 12th SRS configuration. In the case where the UE has received an aperiodic SRS triggering grant in subframe n (for example, n=2, 8) that is not allocated as a periodic SRS subframe, the processor 255 of the UE may select the 12th SRS configuration and the UE may transmit aperiodic SRSs in subframe n+1 (i.e., n+1=3, 9) through a full band thereof according to the 12th SRS configuration.

Here, for example, let us assume that one frame includes 10 subframes and subframe indices 1 to 10 are assigned respectively to the 10 subframes included in one frame. When the difference between the index of a subframe in which an aperiodic SRS triggering grant has been received and the index of a subframe in which an aperiodic SRS triggering grant is to be transmitted (which corresponds to a time relationship between a subframe in which an aperiodic SRS triggering grant has been received and a subframe in which an aperiodic SRS triggering grant is to be transmitted) is 2, the processor 255 of the UE may select the 11th SRS configuration, for example, if the UE has received the aperiodic SRS triggering grant in subframe 5 as shown in FIG. 17A, and may perform an aperiodic SRS transmission operation through a partial band 1710 in subframe 7 according to the 11th SRS configuration. On the other hand, when the difference between the index of a subframe in which an aperiodic SRS triggering grant has been received and the index of a subframe in which an aperiodic SRS triggering grant is to be transmitted (which corresponds to a time relationship between a subframe in which an aperiodic SRS triggering grant has been received and a subframe in which an aperiodic SRS triggering grant is to be transmitted) is 1, the processor 255 of the UE may select the 12th SRS configuration, for example, if the UE has received the aperiodic SRS triggering grant in subframe as shown in FIG. 17B, and may perform a full band aperiodic SRS transmission operation in subframe 9 according to the 12th SRS configuration. Although a resource used to transmit an aperiodic SRS in subframe 9 is denoted by a dashed line 1740 in FIG. 17B, the aperiodic SRS is actually transmitted through a full band. That is, an aperiodic SRS may be discriminated from a periodic SRS through a comb, a cyclic shift, or the like and the aperiodic SRS may be transmitted together with the comb, the cyclic shift, or the like through a full band.

When full-band or partial-band aperiodic SRS transmission has been requested in a subframe in which cell-specific periodic and aperiodic SRSs are multiplexed, the UE may perform SRS transmission according to the first aperiodic SRS configuration or SRS transmission according to the second aperiodic SRS configuration through a specified aperiodic SRS resource.

As shown in FIG. 17A, partial-band aperiodic SRS resources may be allocated in a frequency hopping pattern (as denoted by "1710" and "1720") to efficiently overcome the SRS coverage problem through diversity gain or the like.

The eNodeB may allocate SRS subframes as shown in FIG. 17(c) according to a 13th SRS configuration. The 13th SRS configuration, which is an exemplary partial-band aperiodic SRS configuration, is based on a partial-band aperiodic SRS scheme which does not use frequency hopping. Partial-band aperiodic SRS transmission, which does not use a frequency hopping scheme, is included in the 13th SRS configuration. When the UE has received an aperiodic SRS triggering grant in subframe 5, the UE may transmit an aperiodic SRS through a partial band 1750 of subframe 7 which is an earliest subframe subsequent to the subframe 5. In addition, when the UE has received an aperiodic SRS triggering grant in subframe 9, the UE may transmit an aperiodic SRS through a partial band 1760 of subframe 1 in a frame subsequent to the subframe 9. The partial-band aperiodic SRS transmission scheme which does not use frequency hopping is significantly effective in alleviating the uplink signal interference problem caused by use of a co-channel between HetNets.

Figure 18:
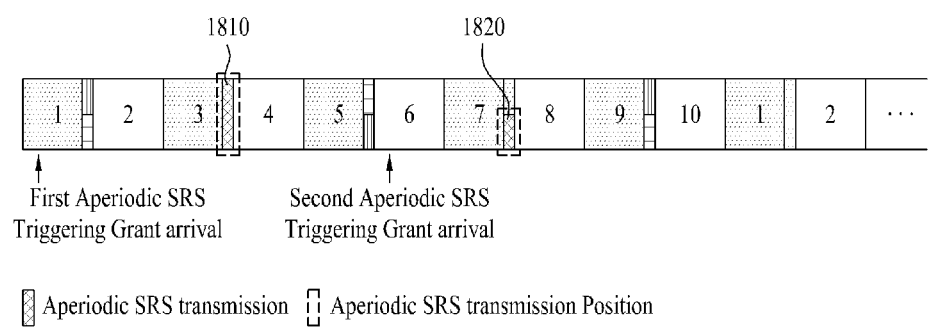
FIG. 18 illustrates aperiodic SRS transmission performed when classification of the index of a subframe corresponding to the time point at which an aperiodic SRS triggering grant is received is applied according to a different basis.

FIG. 18 illustrates aperiodic SRS transmission performed when classification of the index of a subframe corresponding to the time point at which an aperiodic SRS triggering grant is received is applied according to a different basis.

In FIG. 18, when the index of a subframe in which the UE has received an aperiodic SRS triggering indicator (grant) is odd (for example, when the aperiodic SRS triggering grant is received in subframe 1 as shown in FIG. 18), the UE may perform an aperiodic SRS transmission operation through a full band in subframe 3. On the other hand, when the index of a subframe in which the UE has received an aperiodic SRS triggering grant is even (for example, when the aperiodic SRS triggering grant is received in subframe 6 as shown in FIG. 18), the UE may perform a partial-band aperiodic SRS transmission operation in subframe 7.

In another embodiment associated with FIG. 18, when a UE-specific periodic SRS subframe index allocated to a specific UE is n, subframes in which the UE has received an aperiodic SRS triggering grant are divided into a subframe corresponding to a time point of index n–4 and other subframes. Here, the time point of subframe n–4 whose index is "n–4" may be variously defined based on other values.

When the UE has received an aperiodic SRS triggering grant at a time point of subframe n–4, the UE may transmit an aperiodic SRS through a full band of a periodic SRS subframe closest to the subframe n. On the other hand, when the UE has received an aperiodic SRS triggering grant in a subframe corresponding to a time point different from that of the subframe n–4, the UE may transmit an aperiodic SRS through a partial band of a periodic SRS subframe closest to the subframe n. Both the SRS configurations employ a scheme in which the UE performs aperiodic SRS transmission through a periodic SRS subframe closest to a subframe in which the UE has received an aperiodic SRS triggering grant.

As shown in FIG. 18, for example, in the case where the UE has received an aperiodic SRS triggering grant in subframe 1, the UE may perform an operation for transmitting an aperiodic SRS through a full band 1810 since the subframe 1 corresponds to a time point of n–4 with respect to the subframe 5 (n=5). On the other hand, in the case where the UE has received an aperiodic SRS triggering grant in subframe 6, the UE performs an operation for transmitting an aperiodic SRS through a partial band 1820 since the subframe 6 does not correspond to a subframe of time point n–4 with respect to the subframe 9 (n=9).

Figure 19A:
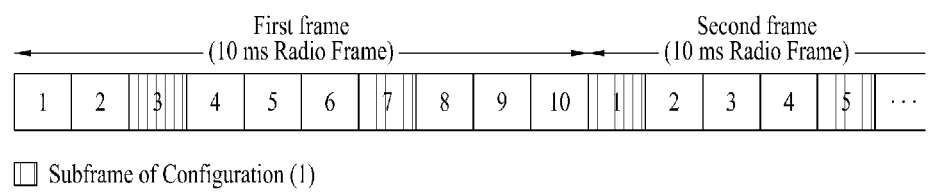
FIGS. 19A and 19B illustrate exemplary aperiodic SRS subframes of SRS configurations.
Figure 19B:
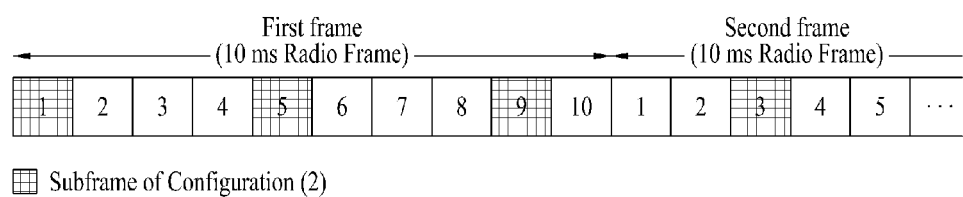

FIGS. 19A and 19B illustrate exemplary aperiodic SRS subframes of SRS configurations.

For ease of explanation, only up to a second frame is illustrated in FIGS. 19A and 19B although frames subsequent to the second frame are also present. As shown in FIG. 19A, an SRS configuration for transmitting an SRS through a partial band may be set so as to have an SRS transmission period (or interval) of 4 ms and a subframe offset of 2 ms. The eNodeB may configure subframes 3 and 7 of a first frame and subframes 1 and 5 of a second frame as SRS subframes through a partial band. That is, the UE may transmit SRSs through partial bands in subframes 3 and 7 in the first frame and in subframes 1 and 5 in the second frame subsequent to the first frame. As shown in FIG. 19B, an SRS configuration for transmitting an SRS through a full band may be set so as to have an SRS transmission period of 4 ms and a subframe offset of 0 ms. The eNodeB may configure subframes 1, 5, and 9 of a first frame and subframe 3 of a second frame as SRS subframes through a full band. That is, the UE may transmit SRSs through full bands in subframes 1, 5, and 9 in the first frame and in subframe 3 in the second frame subsequent to the first frame.

In each of the SRS configurations, the period of subframes in which aperiodic SRSs are transmitted may be specified to be the same as or a multiple of the period of cell-specific periodic SRS subframes since resources for cell-specific periodic SRS transmission are reused as resources for SRS transmission subframes. Although information regarding each subframe for transmitting an SRS through a partial band and each subframe for transmitting an SRS through a full band may be preset between the eNodeB and the UE such that the information is known to both the eNodeB and the UE, the eNodeB may also transmit the information to the UE through higher layer signaling or the like.

Figure 20:
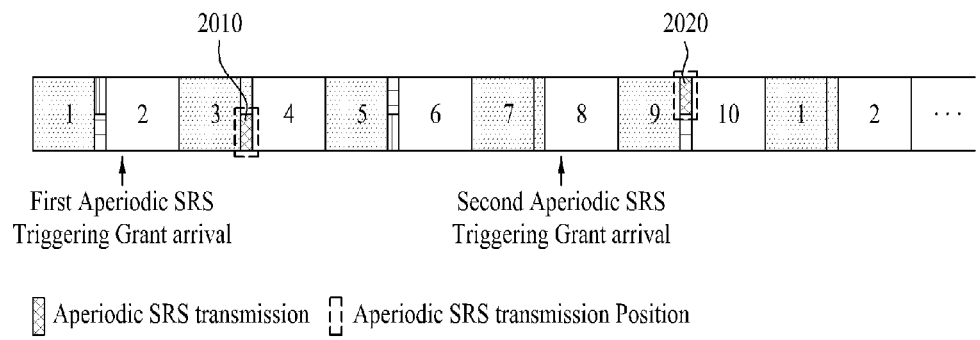
FIG. 20 illustrates switching of aperiodic SRS configuration operations according to a time point at which the UE has received an aperiodic SRS triggering grant and the SRS configurations of FIGS. 19A and 19B.

FIG. 20 illustrates switching of aperiodic SRS configuration operations according to a time point at which the UE has received an aperiodic SRS triggering grant and the SRS configurations of FIGS. 19A and 19B.

The eNodeB may allocate SRS resources through a full band in subframes 1, 5, and 9 while configuring the same as a subframe in which a cell-specific periodic SRS resource and a cell-specific aperiodic SRS resource are multiplexed. The eNodeB may divide the SRS resources of the multiplexed subframe into 2 orthogonal regions (for example, 2 subbands) or divide a total set including pairs of available combs and cyclic shifts into 2 disjoint subsets and may then allocate the divided regions or sections respectively as a periodic SRS resource and an aperiodic SRS resource.

In FIG. 20, it is assumed that a time point at which the UE transmits an aperiodic SRS is determined to be a cell-specific SRS subframe closest to a subframe in which an aperiodic SRS triggering grant is received. As shown in FIG. 20, for example, when the UE has received an aperiodic SRS grant in subframe 2, the UE may transmit an aperiodic SRS through a cell-specific SRS subframe 3 which first comes after the subframe 2. Here, the UE transmits an aperiodic SRS through a partial band 2010 in subframe 3 since the subframe 3 has been set as a subframe for SRS transmission through a partial band in FIG. 19A. The UE transmits an aperiodic SRS through a full band 2010 in subframe 3. In addition, when the UE has received an aperiodic SRS triggering grant in subframe 8, the UE transmits an aperiodic SRS through a cell-specific SRS subframe 9 closest to the subframe 8. Here, the UE transmits an aperiodic SRS through a full band 2020 in subframe 7 since the subframe 9 for SRS transmission has been set as a subframe for SRS transmission through a full band in FIG. 19B.

Figure 21A:
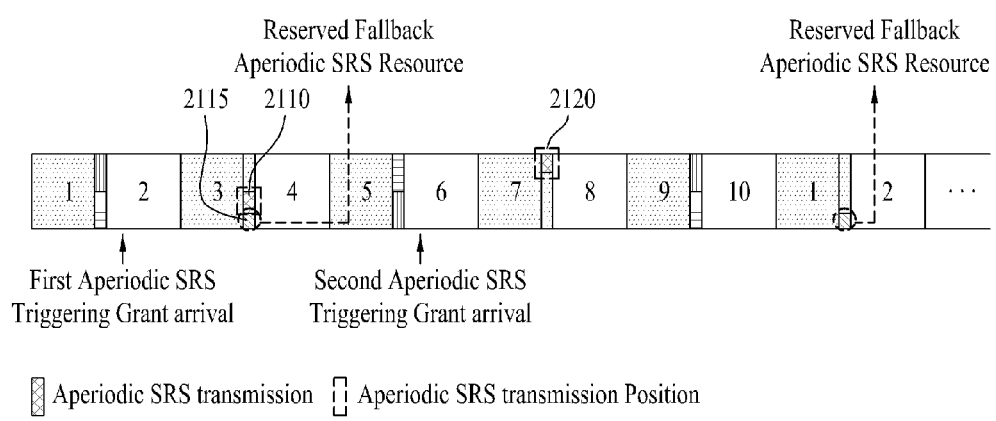
FIGS. 21A and 21B illustrate aperiodic SRS transmission according to a new scheme in which part of an aperiodic SRS transmission resource is allocated and used as a fallback aperiodic SRS transmission resource.
Figure 21B:
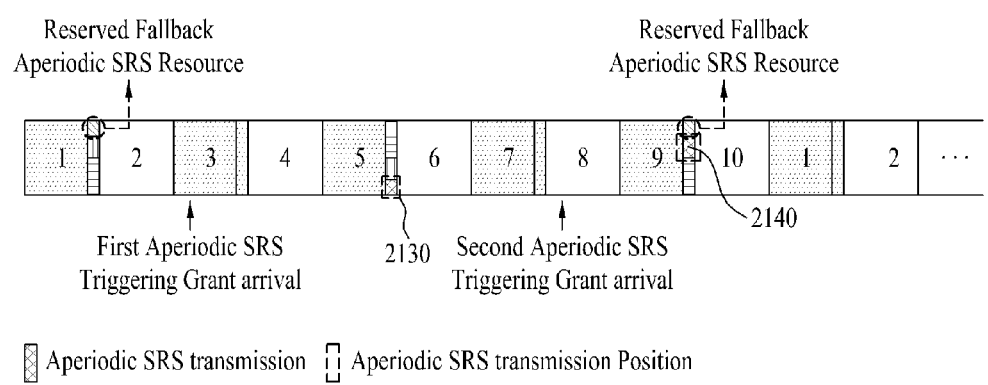

FIGS. 21A and 21B illustrate aperiodic SRS transmission according to a new scheme in which part of an aperiodic SRS transmission resource is allocated and used as a fallback aperiodic SRS transmission resource.

Here, a partial reduced resource block (RB) region of an allocated aperiodic SRS transmission resource 2110 may be used as a fallback aperiodic SRS resource 2115. Alternatively, an entire set including pairs of available combs and cyclic shifts and a resource region disjointed from the aperiodic SRS resource may be divided into 2 disjoint subsets and both may then be separately defined respectively as an aperiodic SRS resource and a fallback aperiodic SRS resource. Allocation of the fallback aperiodic SRS transmission resource shown in FIGS. 21A and 21B is not necessarily based on one of the two fallback aperiodic SRS transmission resource allocation schemes described above and may also be based on both the two schemes.

The partial-band aperiodic SRS transmission scheme shown in FIG. 21A is an aperiodic SRS triggering scheme in which partial-band aperiodic SRS transmission is performed, similar to the scheme of FIG. 20. When the UE has received an aperiodic SRS triggering grant in subframe 2, the UE may transmit an aperiodic SRS through a partial band 2110 of subframe 3 which is a cell-specific periodic SRS subframe closest to subframe 2. When the UE has received an aperiodic SRS triggering grant in subframe 6, the UE may transmit an aperiodic SRS in subframe 7 which is a cell-specific periodic SRS subframe closest to the subframe 6. Here, the processor 255 of the UE may switch SRS transmission to SRS transmission through a fallback aperiodic SRS transmission resource 2120 due to insufficient transmission power or the like in subframe 7.

The full-band aperiodic SRS transmission scheme shown in FIG. 21B is an aperiodic SRS triggering scheme in which full-band aperiodic SRS transmission is performed, similar to the scheme of FIG. 20. According to the full-band aperiodic SRS transmission scheme shown in FIG. 21B, when the UE has received an aperiodic SRS triggering grant in subframe 3, the UE may transmit an aperiodic SRS in subframe 5 which is a cell-specific periodic SRS subframe closest to the subframe 3. Here, the UE may transmit an aperiodic SRS through a fallback aperiodic SRS resource 2130 in subframe 5. In addition, when the UE has received an aperiodic SRS triggering grant in subframe 8, the UE may transmit an SRS through a full band 2140 in subframe 9 which corresponds to a cell-specific periodic SRS transmission subframe closest to the subframe 8.

The eNodeB may notify the UE of such SRS configuration information of FIGS. 21A and 21B through higher layer signaling.

Methods for a UE to transmit aperiodic SRSs in a system next to 3GPP LTE Release 10 have been described above. The purpose of introducing an aperiodic SRS in the 3GPP LTE Release 10 system is to improve the quality of channel estimation by the eNodeB and to more accurately and adaptively estimate channels while reducing overhead of periodic SRS transmission.

The present invention suggests, as another embodiment, a new scheme in which aperiodic SRS transmission control is performed using a different method from when periodic SRS transmission control is performed in order to increase accuracy and efficiency of results of channel estimation of an eNodeB obtained through aperiodic SRS transmission from a UE when aperiodic SRS transmission is performed using various SRS triggering schemes. The scheme suggested in the present invention may be applied to various aperiodic SRS duration environments.

A conventional SRS transmission power equation may be expressed as the following Equation 16.

$$P_{SRS}(i) = \min\{P_{CMAX}, P_{SRS\_OFFSET} + 10\log_{10}(M_{SRS}) + \quad [\text{Equation 16}]$$
$$P_{O\_PUSCH}(j) + \alpha(j) \cdot PL + f(i)\}[\text{dBm}]$$

Here, i denotes a subframe index and $P_{SRS}(i)$ denotes power of an SRS transmitted in subframe i (subframe of index i). Equation 16 includes parameters that the eNodeB semi-statically determines and signals to the UE through higher layer signaling and parameters that the eNodeB dynamically determines and signals to the UE through a Transmit Power Control (TPC) command of a PDCCH.

The eNodeB notifies the UE of $P_{SRS\_OFFSET}$, $M_{SRS}$, $P_{O\_PUSCH(j)}$, and $\alpha(j)$ through a higher layer signal and dynamically notifies the UE of f(i) through a TPC command of a PDCCH. The eNodeB signals $P_{SRS\_OFFSET}$, which is a UE-specific parameter of, for example, 4 bits indicating a power offset value for SRS transmission, to the UE as a semi-statically configured value in a higher layer. f(i) is a value indicating a current PUSCH power control adjustment state and can be represented as a current absolute value or an accumulated value. $\alpha(j)$ is a cell-specific parameter that the eNodeB transmits, for example, as a 3-bit value in a higher layer. $\alpha \in \{0, 0.4, 0.5, 0.6, 0.7, 0.8, 0.9, 1\}$ when j=0 or 1 and $\alpha(j)=1$ when j=2. $\alpha(j)$ is a value that the eNodeB signals to the UE.

$P_{CMAX}$ denotes configured UE transmission power, $M_{SRS}$ denotes a bandwidth of SRS transmission in subframe i expressed as a number of resource blocks, and $P_{O\_PUSCH}(j)$, which the eNodeB signals to the UE, is a parameter configured as the sum of a cell-specific nominal component provided from the higher layer and a UE-specific component $P_{O\_UE\_PUSCH}(j)$ provided from in the higher layer. $\alpha(j)$ is a cell-specific parameter that the eNodeB transmits as a 3-bit value in the higher layer.

PL is a downlink path loss (or signal loss) estimation calculated in dB and is expressed as PL=referenceSignalPower−higher layer filteredRSRP.

Equations for different transmission power control of a period SRS and an aperiodic SRS may be defined by redefining the configured parameters of Equation 16 or adding new parameters to Equation 16.

A power control equation for SRS transmission suggested in the present invention may be represented by the following Equation 17.

$$P_{SRS}(i) = \min\{P_{CMAX}, P_{SRS\_OFFSET} + 10\log_{10}(M_{SRS}) + P_{O_{PUSCH}}(j) + \alpha(j) \cdot PL + H(i)\}[\text{dBm}]$$ [Equation 17]

$$H(i) = \begin{cases} f(i), & \text{if periodic } SRS \text{ transmission} \\ f(i)+V, & \text{if Aperiodic } SRS \text{ transmission} \end{cases}$$

Here, V represents a power offset applied only for aperiodic SRS transmission. The eNodeB may signal V to the UE as one or a plurality of values through a higher layer signal. When V has been set as a single value, the same aperiodic SRS power offset may always be applied regardless of the type of an accumulation-enabled value which is a UE-specific parameter and the DCI format (0/3/3A). On the other hand, when V has been set as a plurality of values, a different aperiodic power offset may be applied depending on a combination of the accumulation-enabled value and the DCI format (0/3/3A). For example, a power offset applied after a TPC command of a PDCCH is received may be set differently depending on the type of an SRS that the UE transmits in subframe i. Here, the values of $P_{SRS\_OFFSET}$, $M_{SRS}$, $P_{O\_PUSCH(j)}$, $\alpha(j)$, PL, and f(i) are commonly applied to periodic and aperiodic SRSs while different values of V are applied to periodic and aperiodic SRSs.

Different power control equations for SRS transmission suggested in the present invention may be expressed as the following Equation 18. In these power control equations, transmission power offsets for periodic and aperiodic SRSs are calculated completely independent of each other. That is, H(i) of Equation 17 may be redefined as in the following Equation 18. In this operation scheme, $P_{SRS\_OFFSET}$, $M_{SRS}$, $P_{O\_PUSCH(j)}$, $\alpha(j)$, and PL values are shared between periodic and aperiodic SRSs while different values of f(i) are applied to periodic and aperiodic SRSs.

$$P_{SRS}(i) = \min\{P_{CMAX}, P_{SRS\_OFFSET} + 10\log_{10}(M_{SRS}) + P_{O_{PUSCH}}(j) + \alpha(j) \cdot PL + H(i)\}[\text{dBm}]$$ [Equation 18]

$$H(i) = \begin{cases} f(i), & \text{if periodic } SRS \text{ transmission} \\ A(i), & \text{if aperiodic } SRS \text{ transmission} \end{cases}$$

Here, A(i) is based on the same calculation scheme as f(i) while $\delta_{PUSCH}$, which is selected according to a combination of DCI format (0/3/3A) and accumulation-enabled values, may be set differently from f(i). A(i) may also be defined using a calculation scheme and a $\delta_{PUSCH}$ which are completely different from f(i).

In addition, as expressed in Equation 18, the f(i) value in the power control equation for periodic SRS transmission and the f(i) value in the power control equation for aperiodic SRS transmission are not common but are independent. As an embodiment in which f(i) is independently applied to periodic SRS transmission and aperiodic SRS transmission in this manner, the present invention suggests a method using TPC information of a DCI format transmitted for SRS triggering. The eNodeB may use, as a DCI format for aperiodic SRS triggering, a conventional DCI format including an aperiodic SRS triggering bit or a DCI format newly defined only for aperiodic SRS triggering. In addition, let us assume that a DCI format for aperiodic SRS triggering always has 2-bit TPC information. In the suggested method, the eNodeB directly and dynamically signals a power offset value to the UE through 2-bit TPC information under such a condition. The power offset may be an absolute or accumulated value. This power offset affects only aperiodic SRS transmission power control.

Another power control equation for SRS transmission suggested in the present invention may be expressed as the following Equation.

$$P_{SRS}(i) = \min$$ [Equation 19]

$$\{P_{CMAX}, P_{SRS\_OFFSET} + 10\log_{10}(M_{SRS}) + P_{O\_PUSCH}(j) + \alpha(j) \cdot PL + f(i)\}[\text{dBm}]$$

$$P_{SRS\_OFFSET} = \begin{cases} P_{Aperiodic\_SRS\_OFFSET}, & \text{if aperiodic } SRS \text{ transmission} \\ P_{Periodic\_SRS\_OFFSET}, & \text{if Periodic } SRS \text{ transmission} \end{cases}$$

In this scheme, the eNodeB signals two UE-specific $PSRS\_OFF_{SET}$ values rather than one UE-specific $P_{SRS\_OFFSET}$ value through a higher layer signal so as to apply different power offsets for SRS types. The eNodeB may discriminate between periodic SRS transmission and aperiodic SRS transmission so as to signal respective $P_{SRS\_OFFSET}$ values of periodic SRS transmission and aperiodic SRS transmission to the UE. For example, in trigger type 0, the eNodeB may notify the UE of a power offset value for periodic SRS transmission through higher layer signaling. In addition, in trigger type 1, the eNodeB may notify the UE of a power offset value for aperiodic SRS transmission through higher layer signaling. Here, the eNodeB may transmit a power offset value for aperiodic SRS transmission to the UE through DCI format 0/4/1A in the FDD and TDD systems or may transmit a power offset value for aperiodic SRS transmission to the UE through DCI format 2B/2C in the TDD system. When triggering of trigger type 0 and triggering of trigger type 1 are simultaneously performed (or simultaneously occur), the UE may perform only trigger type 1 SRS transmission (i.e., aperiodic SRS transmission).

In this case, all parameters excluding $P_{SRS\_OFFSET}$ are common to a power control equation for periodic SRS transmission and a power control equation for aperiodic SRS transmission. The same operation may be performed using $P_{O\_PUSCH}$ instead of $P_{SRS\_OFFSET}$. Accordingly, the processor 255 of the UE may calculate an uplink transmission power value for periodic SRS transmission and an aperiodic SRS transmission power value respectively based on a power offset value for periodic SRS transmission and a power offset value for aperiodic SRS transmission received from the eNodeB through higher layer signaling or the like. Another power control equation for SRS transmission suggested in the present invention may be expressed as the following Equation 20.

$$P_{SRS}(i) = \min$$ [Equation 20]

$$\{P_{CMAX}, P_{SRS\_OFFSET} + 10 \log_{10}(M_{SRS}) + P_{O\_PUSCH}(j) + \alpha(j) \cdot PL + H(i)\}[dBm]$$

$$P_{SRS\_OFFSET} = \begin{cases} P_{Aperiodic\_SRS\_OFFSET}, & \text{if aperiodic } SRS \text{ transmission} \\ P_{Periodic\_SRS\_OFFSET}, & \text{if Periodic } SRS \text{ transmission} \end{cases}$$

$$H(i) = \begin{cases} f(i), & \text{if periodic } SRS \text{ transmission} \\ f(i) + V, & \text{if Aperiodic } SRS \text{ transmission} \end{cases}$$

This method is a hybrid method which combines the first method described above with reference to Equation 17 and the third method described above with reference to Equation 19. In this method, the UE may set different powers for periodic SRS transmission and aperiodic SRS transmission. For example, after a power offset value for aperiodic SRS transmission is set using Equation 19, the power offset of Equation 17 is additionally applied to increase the selection range of offset values. In another embodiment, an aperiodic SRS transmission power offset set through Equation 19 may be set as a coarse value and a power offset applied through Equation 17 may be set as a relatively fine value to enable more detailed power control than in a conventional method. The same advantages and results may be obtained through a combination of the method using Equation 18 and the method using Equation 19.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

A method for transmitting, by a UE, an SRS based on aperiodic Sounding Reference Signal (SRS) triggering and a method for controlling uplink transmission power for aperiodic SRS transmission can be industrially applied to various wireless communication systems such as 3GPP LTE and LTE-A systems.

The invention claimed is:

1. A method of transmitting an aperiodic sounding reference signal (SRS) by a user equipment (UE) in a wireless communication system, the method comprising:
receiving, by the UE through a higher layer signal, uplink power control information, the uplink power control information including a first power offset value related to a periodic SRS transmission and a second power offset value related to an aperiodic SRS transmission, the first power offset value and the second power offset value being semi-statically configured;
receiving, by the UE, information regarding plural configurations for an aperiodic SRS,
wherein each configuration of the plural configurations includes a transmission comb value for the aperiodic SRS;
receiving, by the UE, a first downlink control information (DCI) format in a subframe n, the first DCI format indicating:
triggering the aperiodic SRS transmission, and
a first configuration of the aperiodic SRS among from the plural configurations;
according to the first DCI format, transmitting the aperiodic SRS based on:
the second power offset; and
a transmission comb value of the first configuration of the aperiodic SRS;
receiving, by the UE, a second DCI format, the second DCI format indicating:
triggering the aperiodic SRS transmission; and
a second configuration of the aperiodic SRS among from the plural configurations; and
according to the second DCI format, transmitting the aperiodic SRS based on:
the second power offset; and
a transmission comb value of the second configuration of the aperiodic SRS,
wherein the transmission comb value of the first configuration is different from the transmission comb value of the second configuration.

2. The method of claim 1, wherein the uplink power control information is received through a higher layer signaling.

3. The method of claim 2, wherein the first power offset value and the second power offset value are different from each other.

4. The method of claim 1, wherein the first DCI format or the second DCI format comprises DCI format 0.

5. A user equipment (UE) of transmitting an aperiodic sounding reference signal (SRS) in a wireless communication system, the UE comprising:
a transmitter;
a receiver; and
a processor configured to control:
the receiver to receive uplink power control information, the uplink power control information including a first power offset value related to a periodic SRS transmission and a second power offset value related to an aperiodic SRS transmission, the first power offset value and the second power offset value being semi-statically configured, and the receiver to receive, through a higher layer signal, information regarding plural configurations for an aperiodic SRS, wherein each configuration of the plural configurations includes a transmission comb value for the aperiodic SRS;

the receiver to receive a first downlink control information (DCI) format in a subframe n, the first DCI format indicating:

triggering the aperiodic SRS transmission, and a first configuration of the aperiodic SRS among from the plural configurations for the aperiodic SRS; and the transmitter to transmit, according to the first DCI format, the aperiodic SRS based on:

the second power offset; and a transmission comb value of the indicated configuration of the aperiodic SRS, the receiver to receive, by the UE, a second DCI format, the second DCI format indicating:

triggering the aperiodic SRS transmission; and a second configuration of the aperiodic SRS among from the plural configurations; and the transmitter to transmit, according to the second DCI format, the aperiodic SRS based on:

the second power offset; and a transmission comb value of the second configuration of the aperiodic SRS, wherein the transmission comb value of the first configuration is different from the transmission comb value of the second configuration.

6. The UE of claim 5, wherein the uplink power control information is received through a higher layer signaling.

7. The UE of claim 6, wherein the first power offset value and the second power offset value are different from each other.

8. The UE of claim 5, wherein the first DCI format or the second DCI format comprises DCI format 0.

* * * * *